United States Patent
Morkel et al.

(10) Patent No.: US 10,621,156 B1
(45) Date of Patent: Apr. 14, 2020

(54) APPLICATION SCHEMAS FOR JOURNAL-BASED DATABASES

(71) Applicant: Amazon Technologies, Inc., Seattle, WA (US)

(72) Inventors: John Michael Morkel, Seattle, WA (US); Yevgeniy Mikhaylyuta, Sammamish, WA (US); Allan Henry Vermeulen, Corvallis, OR (US); Tate Andrew Certain, Seattle, WA (US); Atreya Srivathsan, Seattle, WA (US); Andrew Wayne Ross, Seattle, WA (US); Timothy Daniel Cole, Seattle, WA (US); Christopher Richard Jacques De Kadt, Seattle, WA (US); Artem Danilov, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 14/975,357

(22) Filed: Dec. 18, 2015

(51) Int. Cl.
*G06F 17/30* (2006.01)
*G06F 16/23* (2019.01)
*G06F 16/21* (2019.01)
*G06F 16/28* (2019.01)
*G06F 16/2455* (2019.01)

(52) U.S. Cl.
CPC ........ *G06F 16/2329* (2019.01); *G06F 16/219* (2019.01); *G06F 16/2365* (2019.01); *G06F 16/2379* (2019.01); *G06F 16/2393* (2019.01); *G06F 16/24565* (2019.01); *G06F 16/289* (2019.01)

(58) Field of Classification Search
CPC ......... G06F 17/30292; G06F 17/30297; G06F 11/3684; G06F 16/2329; G06F 16/24565; G06F 16/2393; G06F 16/2379; G06F 16/289; G06F 16/219; G06F 16/2365
See application file for complete search history.

(56) References Cited

U.S. PATENT DOCUMENTS

| | | | |
|---|---|---|---|
| 7,127,716 | B2 | 10/2006 | Jin et al. |
| 7,668,876 | B1 | 2/2010 | Kulkarni |
| 7,730,034 | B1 | 6/2010 | Deflaux et al. |
| 7,792,693 | B2 | 9/2010 | Bultmeyer et al. |

(Continued)

OTHER PUBLICATIONS

U.S. Appl. No. 14/316,674, filed Jun. 26, 2014, Allan Henry Vermeulen, et al.

(Continued)

*Primary Examiner* — Shew Fen Lin
(74) *Attorney, Agent, or Firm* — Robert C. Kowert; Kowert, Hood, Munyon, Rankin & Goetzel, P.C.

(57) ABSTRACT

A client-side component of a journal-based multi-data-store database identifies an application schema corresponding to a first application whose data is stored at the database. The application schema includes a writes section indicating a data object to which writes are to be issued from the first application. A journal schema defining one or more data objects for which a concurrency-control protocol is implemented by a journal manager of the database is obtained. Before a transaction request of the application is submitted to the journal manager, the client-side component verifies that the application schema is compatible with the journal schema.

20 Claims, 14 Drawing Sheets

(56) References Cited

U.S. PATENT DOCUMENTS

| | | |
|---|---|---|
| 7,908,311 B2 | 3/2011 | O'Loughlin et al. |
| 7,949,662 B2 | 5/2011 | Farber et al. |
| 8,078,582 B2 | 12/2011 | Wang et al. |
| 8,108,343 B2 | 1/2012 | Wang et al. |
| 8,209,213 B2 | 6/2012 | Raisanen |
| 8,510,270 B2 | 8/2013 | Pareek et al. |
| 8,548,945 B2 | 10/2013 | Dwyer et al. |
| 8,650,155 B2 | 2/2014 | Corbin et al. |
| 8,676,752 B2 | 3/2014 | Kundu et al. |
| 2006/0190497 A1* | 8/2006 | Inturi ............... G06F 16/256 |
| 2007/0162516 A1 | 7/2007 | Thiel et al. |
| 2008/0178166 A1* | 7/2008 | Hunter ............ G06F 9/44521 717/165 |
| 2009/0077164 A1 | 3/2009 | Phillips et al. |
| 2010/0057826 A1 | 3/2010 | Chow et al. |
| 2011/0161391 A1 | 6/2011 | Araujo et al. |
| 2011/0173168 A1* | 7/2011 | Jones ............... G06F 17/3092 707/695 |
| 2011/0276977 A1 | 11/2011 | van Velzen et al. |
| 2012/0023080 A1* | 1/2012 | Bolohan .......... G06F 17/30309 707/705 |
| 2012/0079490 A1 | 3/2012 | Bond et al. |
| 2013/0110767 A1* | 5/2013 | Tatemura ........ G06F 17/30315 707/607 |
| 2013/0124576 A1* | 5/2013 | Adir ................ G06F 11/3684 707/803 |
| 2014/0095432 A1* | 4/2014 | Trumbull ............ G06F 17/30 707/610 |
| 2014/0208303 A1* | 7/2014 | Asayag ............... G06F 8/68 717/170 |
| 2014/0304380 A1 | 10/2014 | Wass et al. |
| 2015/0161181 A1* | 6/2015 | Doms ............ G06F 17/30297 707/697 |

OTHER PUBLICATIONS

U.S. Appl. No. 14/316,630, filed Jun. 26, 2014, Allan Henry Vermeulen.
U.S. Appl. No. 14/316,622, filed Jun. 26, 2014, Allan Henry Vermeulen, et al.
U.S. Appl. No. 14/316,619, filed Jun. 26, 2014, Allan Henry Vermeulen.
U.S. Appl. No. 14/482,661, filed Sep. 10, 2014, Allan Henry Vermeulen.
U.S. Appl. No. 14/482,668, filed Sep. 10, 2014, Allan Henry Vermeulen, et al.
U.S. Appl. No. 14//753,475, filed Jun. 29, 2015, Allan Henry Vermeulen, et al.
U.S. Appl. No. 14/753,484, filed Jun. 29, 2015, John Michael Morkel et al.
U.S. Appl. No. 14/753,505, filed Jun. 29, 2015, Allan Henry Vermeulen, et al.
U.S. Appl. No. 14/833,009, filed Aug. 21, 2015, Andrew Wayne Ross et al.
U.S. Appl. No. 14/833,008, filed Aug. 21, 2015, John Michael Morkel et al.
U.S. Appl. No. 14/833,005, filed Aug. 21, 2015, John Michael Morkel et al.

* cited by examiner

APPLICATION SCHEMAS FOR JOURNAL-BASED DATABASES

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough to support the service levels required for mission-critical operations. Even within a single business organization, different groups of developers and engineers may sometimes be responsible for developing the database applications than are responsible for implementing the transaction management components, which may sometimes lead to dependencies that can reduce the speed at which new versions of the applications or transaction management components can be rolled out.

Figure 1:
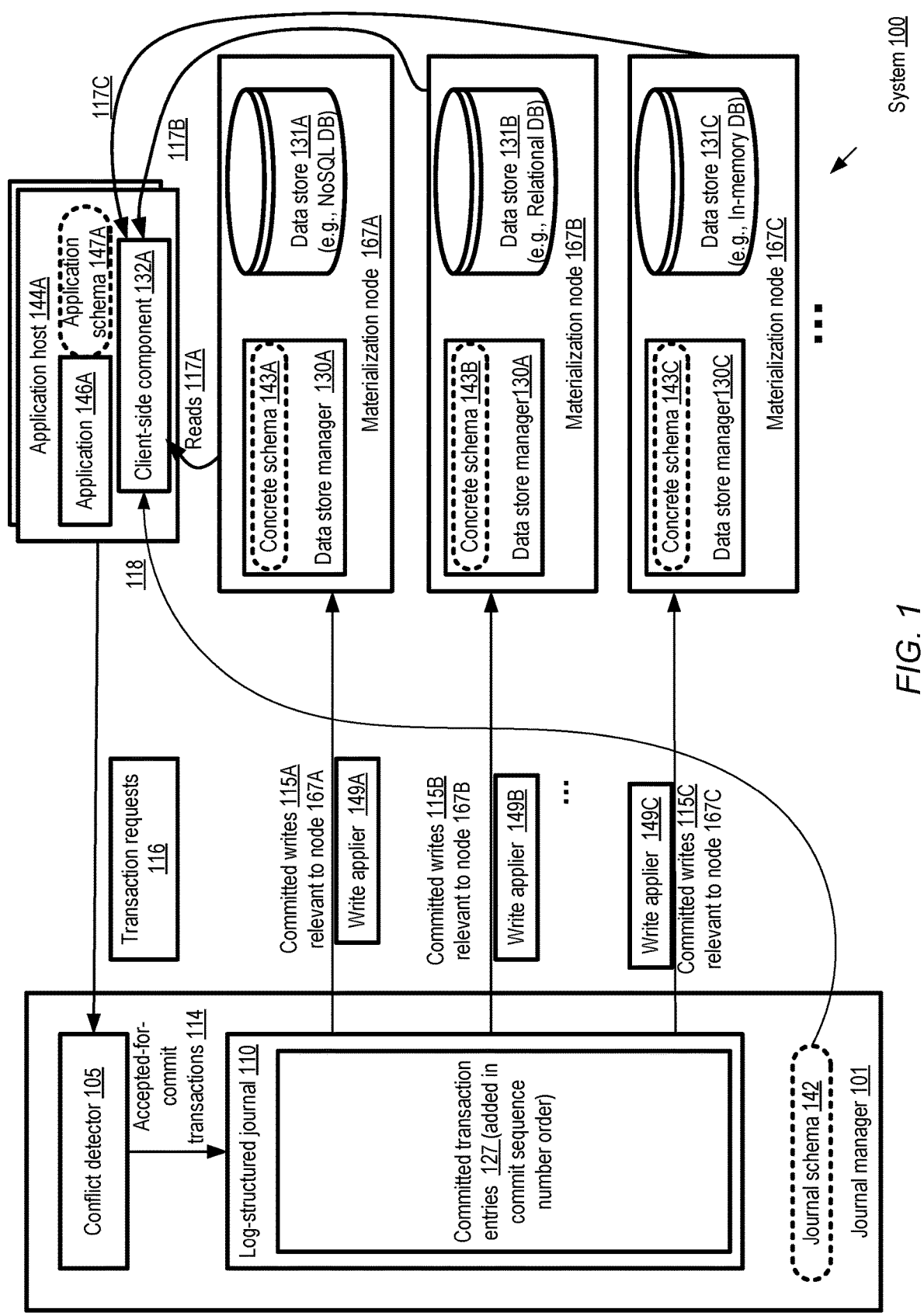
FIG. 1 illustrates an example system environment in which a journal-based multi-data-store database may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof

DETAILED DESCRIPTION

Various embodiments of methods and apparatus for dynamically verifying compatibility of an application with various components of a journal-based multi-data-store database using application schemas are described. In at least some embodiments, a plurality of data stores, some of which may implement different data models and data manipulation languages than others, and some of which may materialize different subsets of the database content than others, may be registered as respective materialization nodes or members of the database. In various embodiments, database applications may utilize client-side components of the database to communicate with a journal manager of the database—e.g., transaction requests representing proposed state changes to the database may be prepared locally and submitted to a journal manager with the help of the client-side components. A client-side component may, for example, include one or more libraries which implement application programming interfaces (e.g., transaction submission APIs or read APIs) supported by the database; such APIs may be invoked by the database applications. In some implementations client-side components may comprise separate threads of execution than the database applications, while in other implementations a client-side component may be loaded as part of a database application process.

The journal manager may perform read-write conflict detection, for example, to determine whether objects read during the preparation of a transaction request may have been modified by subsequently-committed transactions (whose write sets are indicated in respective committed transaction entries appended to the journal). If no conflict is detected, a transaction request may be accepted for commit, and a new committed transaction entry corresponding to the transaction request may be appended to the journal. The committed transaction entries of the journal may each include a respective commit sequence number, indicative of the order in which the journal manager processed the corresponding transaction requests. Each materialization node may have an associated write applier responsible for examining the entries of the journal sequentially and propagating the relevant writes (i.e., those writes which are to be recorded at that materialization node) to the materialization node. The optimistic concurrency control algorithm implemented by the journal manager may enable higher transaction rates to be sustained for at least some types of applications than would have been possible using traditional locking-based concurrency control techniques, especially in environments where the level of contention (which leads to read write conflicts) is low.

A wide variety of data store types may be registered as members of such a journal-based system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. In at least some embodiments, for example, some data stores may present different interfaces for read operations, and a client-side component may submit reads to different data stores via their respective read interfaces on behalf of an application. The data stores registered at a given time for transaction management via a given logical instance of a journal of a multi-data-store database may be referred to as "member" data stores of that database as of that time. Generally speaking, multiple logical journal instances may be used simultaneously, each associated with a corresponding multi-data-store database with its own member data stores. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

In various embodiments, some of the primitive data types supported at one member data store may not be supported at another. For example, integer values may be stored using 64 bits in one data store, and using 32 bits in another. Similarly, the implementation and precision of real numbers may differ from one data store to another. The manner in which text variables or attributes are handled may differ across data stores in some cases—e.g., the maximum supported length of a character array may differ, support for variable-length character arrays or strings may differ, and so on. The details of the implementation of binary objects (e.g., "blobs"), such as the maximum size of binary objects, etc., may differ from one store to another. Some data stores may not offer the same kinds of data manipulation operations as others. Furthermore, in at least some embodiments, the kinds of indexes, constraints and/or other metadata objects which may be supported may differ from one data store to another. In various embodiments, a data-store-independent or data-store-agnostic transaction language may be employed for transaction requests submitted to the journal manager, e.g., to ensure that such differences among the different data stores can be managed.

A common journal schema may be employed in some embodiments, indicating rules regarding acceptable transaction requests which can be submitted to the journal manager by client-side components. Such rules may, for example, indicate the syntax of the transaction language, properties of data objects (e.g., data types of various attributes or columns of a table, acceptable values of the data objects, etc.), the kinds of transactions which can be submitted, and so on. With respect to acceptable values for the attributes of data objects, the journal schema may support "maximally-overlapping" attribute value ranges with respect to the individual data stores, as described below in further detail. For example, if one member data store supports 64-bit integers, and another member data store supports only 32-bit integers, the journal schema may only permit 32-bit integers. The journal schema may also be referred to as the abstract or generic schema of the database, while the respective schemas of the individual data stores, from which the journal schema may be derived in some embodiments, may be referred to as "concrete" or data-store-specific schemas.

The journal schema of the storage system itself may evolve over time, e.g., as new data objects and/or new object attributes are added, or if new features or capabilities are added to the data-store-independent transaction language. Generally speaking, if the storage system comprises N data stores at a given point in time, the explicit or implicit approval of the corresponding N data store managers may be required for a new version of the journal schema to be adopted. In some embodiments, after the member data store managers approve, a journal entry indicating that a new version of the journal schema has been adopted or committed may be inserted into the journal. Thus, journal entries of several types, including entries representing data object modifications and entries representing journal schema modifications, may be supported in various embodiments.

Just as the journal schema may evolve over time, new versions of the applications that utilize the journal-based database may also be created over time. Some of the changes made (either to the journal schema or in the application) may affect the kinds of write operations that can be performed—for example, writes to a new attribute of a data object may be added to an application, or an attribute of a data object may be removed from the journal schema. According to at least one embodiment, each application that utilizes the journal-based database may have an application schema generated for it, indicating the kinds of write operations the application is expected to issue to the database. For example, the names of data object attributes expected to be writable from the application, the data types of the attributes, permitted value ranges for writes to the attributes, and the like may be indicated in a "writes" section of the application schema. (An application schema may also include one or more "reads" sections as discussed below.) The application schema may be created, for example, as a file in JSON (JavaScript Object Notation format) or XML (Extensible Markup Language) format by the application's developers based on examining the journal schema and the based on the application's business logic. In some embodiments, the application schema may be stored as a metadata artifact associated with the application, e.g., in an application deployment package or directory. In some embodiments, an application schema may be generated automatically, e.g., by a tool based on an automated analysis of the application code.

A client-side component of the database may check, for example before submitting a transaction request and/or in response to detecting other triggering conditions, whether the current version of the application is compatible with the current version of the database. Such compatibility verification may be performed in some embodiments by comparing the most recent version of the journal schema (obtained at the client-side component from the journal manager) with the most recent version of the application schema (obtained from the application's metadata collection, or passed to the client-side component as a parameter of an API by the application code). If the data objects and data object properties in the current journal schema version are write-compatible with the corresponding entities indicated in the writes section of the current application schema, the application may be deemed compatible with the journal-based database, and the client-side component may transmit proposed write-containing transactions on behalf of the application to the journal manager. Data objects DO1-AppSchema (defined in the application schema) and DO1-JournalSchema (defined in the journal schema) may be considered to be-write compatible in one embodiment if (a) the operation of storing an object with the properties indicated for DO1-AppSchema into the space allocated for an object of type DO1-JournalSchema would not result in an error, and (b) if any of the constraints (e.g., value range constraints or semantic constraints) indicated for DO1-JournalSchema could not be violated as long the corresponding constraints indicated for DO1-AppSchema are met. Other definitions of write-compatibility may be used in some embodiments.

The application schema may be deemed to conflict with the journal schema for any of several reasons. A conflict may result if, for example, at least one data object indicated in the application schema is not present in the journal schema, or if the size (number of bytes) of a data object in the application schema exceeds the size indicated in the journal schema for that same object, or if the constraints (such as value ranges) of the journal schema definition of the data object could be violated even though the data object complies with the constraints in the application schema version. With respect to one implementation in which supported data objects include tables, consider a scenario in which "table-A" is defined in the application schema with a 64-bit integer attribute "Attr-1". If the journal schema does not include "table-A", a conflict would be detected in this scenario. Similarly, if the journal schema includes "table-A" but does not include "Attr-1" as one of that table's attributes, a conflict would be detected. If "table-1" is defined in the journal schema and has a 32-bit integer attribute "Attr-1", a conflict would also be detected because a write of a 64-bit integer (the kind of integer indicated in the application schema) may fail if only 32 bits are allocated for it (in accordance with the journal schema). In contrast, if the journal schema version of "Attr-1" was a 64-bit integer, and the application schema version of "Attr-1" was either a 32-bit integer or a 64-bit integer, no schema conflict may be detected. If, based on its analysis of the journal schema and the application schema, the client-side component identifies a conflict between the two schemas, in some embodiments an error message may be generated to indicate that the application is incompatible with the database. In some such embodiments, the client-side component may not transmit transaction requests on behalf of the application to the journal manager until one or both of the schemas (the application schema and/or the journal schema) are modified to make them write-compatible. If changes are made to the application schema to align it with the journal schema, corresponding modifications may be applied to the application code in some embodiments.

In some embodiments, an application may support multiple versions of the application schema. For example, one subcomponent Module1 of the application may originally include write operations corresponding to application schema version ASV1. In an updated version of the application, expected to be rolled out at some point in the future, application schema version ASV2 may be used. Because the exact timing of the changes to the journal schema which may be required to make ASV2 compatible may not be known, the code for Module1 may be enhanced in the following way. One conditional code block CCB1 may contain the write operations and other associated logic compatible with ASV1, and a second conditional code block CCB2 may be prepared with write operations and associated logic compatible with ASV2. In effect, the original version of Module 1 may be replaced by the equivalent of the pseudo-code:

if (ASV1 is compatible with the journal schema) run CCB1; else if (ASV2 is compatible with the journal schema) run CCB2.

In some embodiments, the client-side component may provide APIs which can be used in the application code to check the truth values of the conditions (the "if" clauses in the example above).

In at least one embodiment, an application schema may include one or more "reads" sections, indicating expected properties of the data objects of the journal-based database to which reads may be issued by the application to one or more of the member data stores. Each member data store may have an associated local or concrete schema, defining the data types of database objects materialized at the data store, permitted values or ranges of various attributes, indexes created on the data objects and so on. In some embodiments, more than one representation of a given concrete schema may be prepared with respect to a given member data store—for example, one representation may be formulated in a data-store-specific language, while another representation (which may be used for compatibility checking with reads sections of application schemas as described below) may be derived from the data-store-specific version and expressed in a data-store-agnostic or data-store-independent language. In other embodiments, a single representation of a given concrete schema may be created, e.g., in a selected language or format which enables client-side components to perform compatibility checks with respect to application schema reads sections. A reads section may comprise descriptors of data objects (e.g., names of objects such as materialized tables and their attributes, data types of the attributes, etc.), similar to those discussed above with respect to writes sections of application schemas in some embodiments. In addition, in various embodiments the reads section may also indicate indexes that the application is expected to use, the types of queries (e.g., queries which involve the use of aggregate functions or user-defined functions) that the member data stores are expected to support, and so on. In some embodiments a data-store-independent language may be used for reads sections and/or writes sections of the application schema. In other embodiments, a reads section may be expressed in a data-store-specific syntax or language. Multiple reads sections may be included in the application schema if the application is designed to read data from several different member data stores. It is noted that the set of data objects to which writes are directed from an application may differ from the set of data objects to which reads are directed, so the reads section(s) may indicate different data objects than the writes section. Before submitting a read request on behalf of the application to a particular data store at which a materialized version of the to-be-read objects are stored, and/or in response to other triggering conditions, a client-side component of the database may verify the compatibility of the reads section of the application schema with the concrete schema of the data store. The current version of the concrete schema may be obtained by the client-side component and analyzed to ensure that the kinds of reads indicated in the reads section of the current version of the application schema would succeed. If the compatibility verification with the concrete schema fails, error messages may be generated. In some embodiments, instead of performing the compatibility verification, the client-side component may submit the application schema (or the appropriate reads section of the application schema) to the data store and in a compatibility verification request, and the data store manager may perform the requested verification with respect to the reads section. Similarly, in some embodiments, the journal manager may perform verification checks to ensure that the writes section of an application schema is compatible with the current journal schema, e.g., at the request of the client-side component.

In some embodiments a journal-based pre-approval protocol may be used to modify the journal schema. For example, before a proposed change to the journal schema is committed, an acceptability verification request indicating the proposed change may be submitted to the journal manager by a client-side component, and a corresponding entry may be appended to the journal. The approval verification request may be examined by the data store managers (e.g., as part of the normal sequential examination of journal entries performed by respective write appliers of the data stores). Each data store manager may respond to the acceptability verification request, e.g., by submitting a positive response to the journal manager indicating that the proposed change is compatible with the data store's concrete schema, or by submitting a negative response indicating that the proposed change is incompatible with the data store's concrete schema. The responses to the acceptability verification request may be generated without actually enacting the proposed changes—in effect, each data store manager may be given an opportunity to veto the proposed change before it takes effect. Entries containing the responses of the data store managers may be appended to the journal, so that they can be read by the client-side component which submitted the acceptability verification request. In at least one embodiment, if the client-side component can verify (e.g., within some timeout period) that each of the member data stores of the database has responded positively to the acceptability verification response, the client-side component may submit a transaction request to commit the proposed journal schema change to the journal manager. Unless the journal manager detects a conflict, the change to the journal schema may be committed. Transactions submitted after the commit to the journal schema may have to conform to the new version of the journal schema.

In at least one embodiment, a pre-approval protocol analogous to the protocol described above may also be employed for application schema changes. If and when a change to an application schema is proposed (e.g., because a new version of the corresponding application, with different write and/or read requirements than the current version has been or is being developed), an acceptability verification request indicating the proposed changes may be submitted by the corresponding client-side component to the journal manager. An entry corresponding to the acceptability verification request may be appended to the journal. In some embodiments other client-side components and/or data store managers may be given the right to approve or veto the proposed change by sending responses to the acceptability verification request for the application schema. In one embodiment, for example, client-side components and/or data store managers may register as approvers of application changes (e.g., by submitting registration requests to the journal manager). In other embodiments, client-side components and/or data store managers may be granted the privilege to approve or reject proposed application schema changes by default; i.e., registration may not be required. If, for example, the proposed application schema change involves modifying the data type of an object to which writes are going to be submitted from several different applications, in some cases the change may not be compatible with the write requirements of one of the other applications. Similarly, the proposed change to the application schema may be rejected by a data store manager if the change is incompatible with the concrete schema of the corresponding data store.

If a rejection or negative response is received from one of the entities to which acceptability verification privileges are granted, the proposed change to the application schema may be abandoned. If positive responses are received from all the entities, the application schema change may be committed. In various embodiments, respective journal entries may be appended indicating the responses received from the other client-side components and/or the data store managers, and such journal entries may be examined by the change-proposing client-side component to determine whether to commit or abandon the change. In some embodiments, a transaction request to commit the application schema change may be submitted to the journal manager. In other embodiments, such a transaction request may not be required, and the client-side component which submitted the acceptability verification request may simply start using the new version of the application schema after the positive responses to the acceptability verification requests are examined.

Example System Environment

FIG. 1 illustrates an example system environment in which a journal-based multi-data-store database may be implemented, according to at least some embodiments.

System 100 shows a journal manager 101 of a log-structured journal 110 that may be used to store records of state changes of a multi-data-store database. The journal manager may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes were approved, e.g., in increasing order of commit sequence numbers. The database may include one or more materialization nodes 167, such as 167A-167C, at each of which at least a subset of the database contents are materialized. Each materialization node may include a respective data store 131 (e.g., data stores 131A-131C) and a corresponding data store manager (DSM) 130 (e.g., DSMs 130A-130C) implemented at one or more computing devices.

A respective concrete schema 143 (e.g., concrete schemas 143A-143C for data stores 131A-131C) may govern the data object types, attribute types and allowed values, and various other aspects of each of the data stores. A journal schema 142 (which may be based on and/or compatible with each of the concrete schemas of the data stores 131 as described below in further detail) may specify or govern various aspects of transaction management in system 100—e.g., the syntax of a data-store-independent transaction language in which state change requests are to be submitted to the journal manager by client-side components 132 (e.g., 132A) on behalf of applications (e.g., 146A), and/or the data types and attributes which can be references in such requests. Each data store manager may ensure that any changes made to the journal schema 142 are compatible with the local concrete schema 143 in various embodiments. Each application such as 146A may have an associated application schema (e.g., 147A) indicating, for example, expected properties of the data objects to which the application is going to direct writes (and/or reads) in the depicted embodiment. The client-side components 132 of the multi-data-store journal-based database may check (e.g., prior to submitting write-containing transactions to the journal manager, or read requests to the data stores) the compatibility of the current versions of their respective application schemas 147 with respect to the journal schema 142 (for writes) and/or the concrete schemas 143 (for reads) as discussed below. Various additional details regarding the contents of, and the relationships between, the journal schema 142, the concrete schemas 143 and the application schemas 147 are provided below.

The data stores 131 may be referred to as member data stores of the database or storage system. The member data stores 131 may differ from each other in various characteristics such as their supported data models and/or data manipulation languages, level of data consistency supported, transaction support, data persistence/durability level, and the like. For example, data store 131A may comprise an instance of a NoSQL or non-relational database that does not implement a standard version of the structured query language (SQL)), data store 131B may comprise an instance of a relational database, and data store 131C may comprise an instance of an in-memory database. Each of the data stores may be registered for transaction management by the journal manager 101 in the depicted embodiment. The terms "concurrency control" and "transaction management", may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal, including entries representing data modifications, journal schema modifications, application schema modifications, redactions of other entries, and the like as discussed below in further detail.

The term "data store", as used herein, may refer to an instance of any of a wide variety of persistent or ephemeral data repositories and/or data consumers. For example, some data stores such as 131A may comprise persistent non-relational databases that may not necessarily provide native support for multi-item transactions, while other data stores such as 131B may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases such as 131C, instances of a distributed cache, network-accessible block storage services, file system services, and the like. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

In the depicted embodiment, transaction-submitting client-side components 132 of the database may construct transaction requests locally at application hosts 144 (e.g., host 144A) on behalf of applications 146, and then submit (or "offer") the transaction requests for approval and commit by the journal manager 101. In one implementation, for example, a client-side library may enable an application 146 to initiate a proposed transaction by issuing the logical equivalent of a "transaction-start" request. Within the candidate transaction, the application may perform some number of reads on a selected set of objects at data stores 131, and locally (e.g., in local memory) perform a proposed set of writes directed at one or more data stores. The application may then submit the proposed transaction by issuing the equivalent of a "transaction-end" request. In some embodiments, before submitting a write-containing transaction (and/or in response to other triggering events), the client-side component 132 of the database may verify that the current version of the application schema 147 is compatible with the current version of the journal schema 142. In at least one embodiment, before a given read 117, a similar compatibility check of the application schema with respect to the concrete schema of the targeted data store 131 may be performed. In at least some embodiments, the client-side component may obtain the current journal schema from the journal manager (and/or concrete schemas from the appropriate data store managers) for the compatibility check. In other embodiments the client-side component may transmit a compatibility check request containing the current version of the application schema to the journal manager (and/or to appropriate data store managers), and the responses received from the journal manager (and/or the data store managers) may contain the results of compatibility checks.

A transaction request 116 may be received at a conflict detector 105 of the journal manager 101 in the depicted embodiment. In general, in at least some embodiments, a given transaction request 116 may include a read set descriptor indicating one or more reads (e.g., reads 117A, 117B or 117C) respectively from one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language indicated or referenced in journal schema 142 in various embodiments. The client-side components 132 may obtain the latest version of the journal schema 142 directly from the journal manager as indicated via arrow 118 (e.g., using a programmatic read interface supported by the journal manager), and/or via reads from the materialization nodes 167 from which materialized versions of the journal schema may be obtained in a manner similar to the way materialized versions of various data objects are obtained. In at least one embodiment, a journal manager 101 may maintain a materialized version of the journal schema which can be obtained by various client-side components 132. In some embodiments, a client-side component 132 may itself include a module capable of materializing a journal schema 142 after examining a set of journal entries indicating respective journal schema changes. In at least some embodiments, the journal manager may not necessarily check whether a submitted transaction request is compliant with the current version of journal schema 142—instead, the client-side components 132 may be responsible for ensuring that their requests are formatted in accordance with the journal schema. In other embodiments, the journal manager may verify that a transaction request complies with the current version of the journal schema, and may reject requests that do not comply. The compatibility checking of the application schema with respect to the journal schema may be considered an additional safety check that helps to identify potential problems (e.g., changes to application logic that are not timed appropriately with respect to changes to the journal schemas and/or concrete schemas) proactively.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions 114 may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 12) in the depicted embodiment before the commit is considered successful. In some embodiments, the requesting client-side component 132 may be notified when the requested transaction is committed. In at least one embodiment, the client-side component 132 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector in some embodiments, or at a different component associated with the journal (such as the committer node of a replication graph being used) in other embodiments.

In the depicted embodiment, after a given transaction is committed and its entry is stored at the journal, at least some of the writes of the transaction may be applied or propagated to one or more of the materialization nodes 167. Different subsets of the committed writes may be of interest to, or relevant to, different materialization nodes in some embodiments, as indicated by arrows 115A-115C. In various embodiments, the respective data store managers 130 at the materialization nodes may verify that a given write is compliant with the journal schema 142 (and therefore with the concrete schema 143 of the data store) before the write is applied. In some implementations, the writes may be applied in an asynchronous fashion to the materialization nodes. In such implementations, there may be some delay between the time at which the transaction is committed and the time at which the payload of a particular write operation of the committed transaction reaches the corresponding data store. In some embodiments, respective asynchronous write appliers 149 (e.g., write appliers 149A-149C) may be used to propagate some or all of the writes to relevant data stores. In some embodiments, the write appliers may be components of the journal manager 101, while in other embodiments the write appliers may be components of the data store managers 130, and may represent respective cursors on the journal. In some embodiments, a given write applier may be responsible for propagating writes to more than one data store, or a single data store may receive writes from a plurality of write appliers. In at least one implementation, a pull technique may be used to propagate written data to the data stores—e.g., one or more data stores may submit requests for writes to the journal manager or the write appliers, instead of being provided written data at the initiative of the write appliers. After the data written during a transaction is applied to the corresponding data stores, client-side components may be able to read the updated data using the respective read interfaces of the data stores. In some embodiments, at least one of the write appliers may be capable of performing synchronous writes (e.g., either when explicitly directed to do so by the journal manager or a data store manager, or for all the writes for which the applier is responsible).

In at least one embodiment, the journal manager may implement respective sets of read and write programmatic interfaces (e.g., application programming interfaces or APIs). The journal manager's write interfaces may be used by authorized entities (such as client-side components 132) to submit transaction requests, while the read interfaces may be used by various authorized entities (e.g., including write appliers and/or the client-side components) to read contents of journal entries 127, obtain journal schemas, and the like. In at least one embodiment, a data store manager 130 may be authorized to invoke the journal manager's write interfaces—e.g., by submitting certain types of transaction requests. Thus, in such embodiments, a data store manager may act as a transaction-submitting client-side component as well as a consumer or reader of journal entries.

In various embodiments, as described below in further detail, in addition to a read set descriptor and a write set descriptor, a given transaction request 116 may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager or a query from a client-side component. The write appliers 149 may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167. In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control mechanism illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

In at least some embodiments, the journal schema 142 may evolve over time. For example, new transactional operations or "verbs" may be added to support new categories of transactions, new data objects, attributes, and/or attribute value changes may be introduced, and so on, as the requirements of the multi-data-store database change. At any given time, a particular version of journal schema 142 which has been approved by the data store managers of all the member data stores (and/or by one or more client-side components) may be in effect at system 100. Before a new version of the journal schema takes effect, each of the member data stores' managers may be required to approve the new version in the depicted embodiment. The new version of a journal schema may be proposed, for example, by a client-side component 132A (e.g., in a transaction request). In at least one embodiment, a data store manager may submit a schema change request to the journal manager and/or to peer data store managers. The new version of the journal schema may be analyzed to ensure compatibility with each data store's concrete schema in some implementations as part of the approval procedure—e.g., a given data store manager may verify that the proposed change to the journal schema does not violate any requirements or constraints imposed by the local concrete schema 143. After verifying compatibility with the concrete schema and/or performing other checks, a given data store manager may transmit an indication of an approval of the schema change to the journal manager in some embodiments. After each of the data store managers has approved the change, the new version of the journal schema may be considered "committed" in such embodiments. In one embodiment, a change to the journal schema may also have to be approved by one or more client-side components other than the client-side component which proposed the change. In various embodiments, an approved modification of the journal schema 142 may be represented by its own committed transaction entry in journal 110—e.g., changes to the journal schema may be handled in a manner similar to changes in the state of the data objects of the database.

In one embodiment, a similar proactive compatibility verification protocol may be used with respect to proposed changes to application schemas. For example, an acceptability verification request indicating a proposed change to an application schema 147 may be submitted to the journal manager by a particular client-side component 132A, and the proposed changes may not take effect until approvals are received from one or more other client-side components and/or data store managers. In one embodiment a journal manager may also be granted the right to reject proposed application schema changes.

Schema Contents

Figure 2:
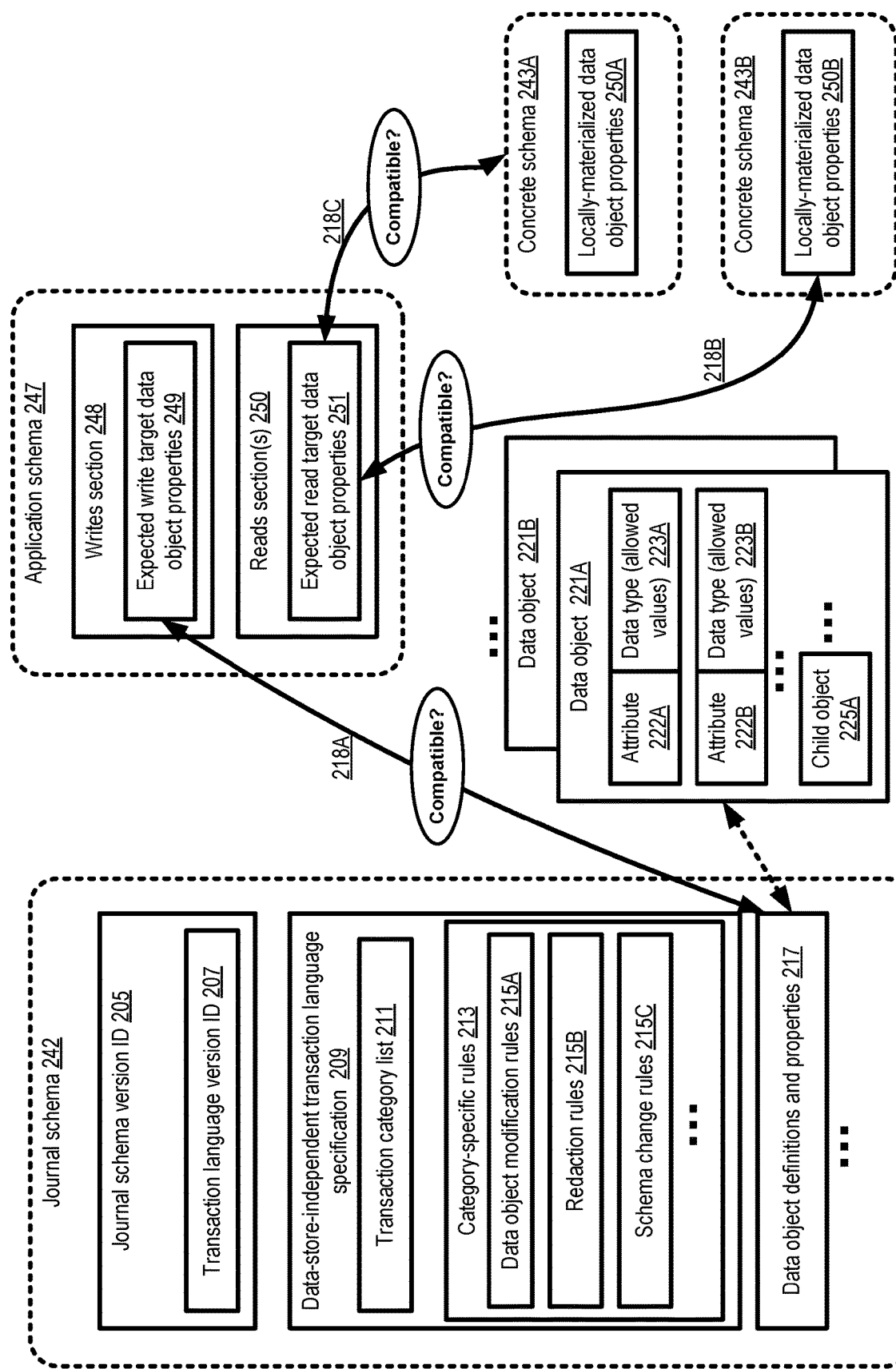
FIG. 2 illustrates examples of the types of elements which may be included in various types of schemas of a journal-based database: a journal schema, an application schema, and concrete schemas, according to at least some embodiments.

FIG. 2 illustrates examples of the types of elements which may be included in various types of schemas of a journal-based database: a journal schema, an application schema, and concrete schemas, according to at least some embodiments. At a high level, a journal schema 242 may govern the rules for database transactions, an application schema 247 may represent the expectations of the corresponding application regarding what can be written to or read, and a concrete schema such as 243A or 243B may represent what is materialized in a given member data store of the database. Each type of schema may evolve over time in the depicted embodiment. To support database operations of various kinds without errors, the current versions of the three types of schemas may have to be compatible with one another in the depicted embodiment.

As shown, a journal schema 242 may contain a version identifier 205 in some embodiments. As mentioned earlier, new versions of the journal schema may take effect after approval by the various data store managers of the materialization nodes (and/or client-side components) of the storage system in various embodiments. In at least one embodiment, a journal schema 242 may include a specification 209 of a data-store-independent transaction language, which is to be used for preparing transaction requests submitted to a journal manager. In some embodiments, the transaction language may have its own separate version number (e.g., because a change to a journal schema version may not necessarily involve a corresponding change to the transaction language). An identifier 207 of the transaction language version may be included in the journal schema 242 in such embodiments, e.g., either embedded within the journal schema identifier or as a separate element of the journal schema.

A number of different transaction or state change categories may be supported at the storage system in various embodiments. For example, supported transaction categories may include data object modification transactions, redactions and/or schema changes. A list 211 of the transaction categories may be indicated explicitly or implicitly in the transaction language specification 209 in the depicted embodiment. Corresponding to some or all of the categories, a respective set of category-specific rules may be indicated in the journal schema 242. For example, the category-specific rules 213 may include data object modification rules 215A, redaction rules 215B, schema change rules 215C, and the like. In one embodiment separate sets of schema change rules may be defined for journal schema changes versus application schema changes. Each set of rules may for example indicate the acceptable syntax (e.g., the types of transaction verbs such as INSERT, DELETE, UPDATE and the like) for the corresponding types of requests, acceptable format(s) in which the requests are to be expressed, and so on. To prepare a given transaction request, in various embodiments a client-side component may use the category-specific rules of the current version of the journal schema for the kind of state change which is being requested.

Details regarding the names, attributes and attribute values of data objects of the storage system may be provided in a collection of data object definitions and properties 217. A particular data object such as 221A may include a collection of attributes 222 (e.g., attributes 222A and 222B), each of which may have a data type 223 (e.g., 223A and 223B) indicating a range or set of allowed values, or some other similar indicator of allowed values. In some embodiments, the range of allowed values may be indicated by the name of the data type—e.g., an "int32" data type may indicate that signed integer values which can be expressed using 32 bits are allowed. In various embodiments, the set of values permitted for a given attribute may be determined using a "maximum overlap" approach with respect to the attribute values permitted at the different member data stores, as discussed in further detail below with respect to FIG. 3. Some data objects may be organized hierarchically (in parent-child relationships) in at least one embodiment—e.g., data object 221A may comprise a set of child objects such as 225A, with each child object having its own attribute set and data types or allowed attribute values. In some embodiments, the data objects 221 may be considered analogous to tables of relational or non-relational databases, with the attributes 222 corresponding to table columns. Journal schemas 242 may comprise additional elements beyond those shown in FIG. 2 in one embodiment, while some of the elements shown in FIG. 2 may not be supported in other embodiments.

In the depicted embodiment, application schema 247 includes a writes section 248 and one or more reads sections 250 (e.g., reads section 250A). The writes section 248 indicates expected properties 249 of data objects that are write targets of the application (i.e., data objects to which writes are going to be issued from the application), while each reads section 250 contains expected properties 251 of data objects which are to be read by the application from a member data store of the database. In some embodiments, a respective reads section 250 may be defined in the application schema 247 for each data store to which read requests are issued on behalf of the application. In other embodiments, a single reads section may indicate all the expected properties of data objects that are going to be read by the application, even if some of the objects are located in different data stores or different materialization nodes than others. In some embodiments, application schemas may not contain reads sections. In one implementation, separate read schema artifacts and write schema artifacts may be used instead of combining the two kinds of schema information into one schema file—e.g., an application's metadata may include a write schema file and one or more read schema files.

The client-side component associated with an application may perform or initiate compatibility checks in the depicted embodiment to ensure that the expectations of the application with respect to writes and reads are met. As indicated by arrow 218A, the writes section 248 may be analyzed for compatibility with the data object definitions and properties 217 of the journal schema. Each concrete schema 243 (e.g., 243A and 243B) may indicate the properties of the data objects materialized at a particular member data store of the database. As indicated by arrows 218B and 218C, the reads sections 251 may be checked for compatibility with the concrete schemas 243.

Figure 3:
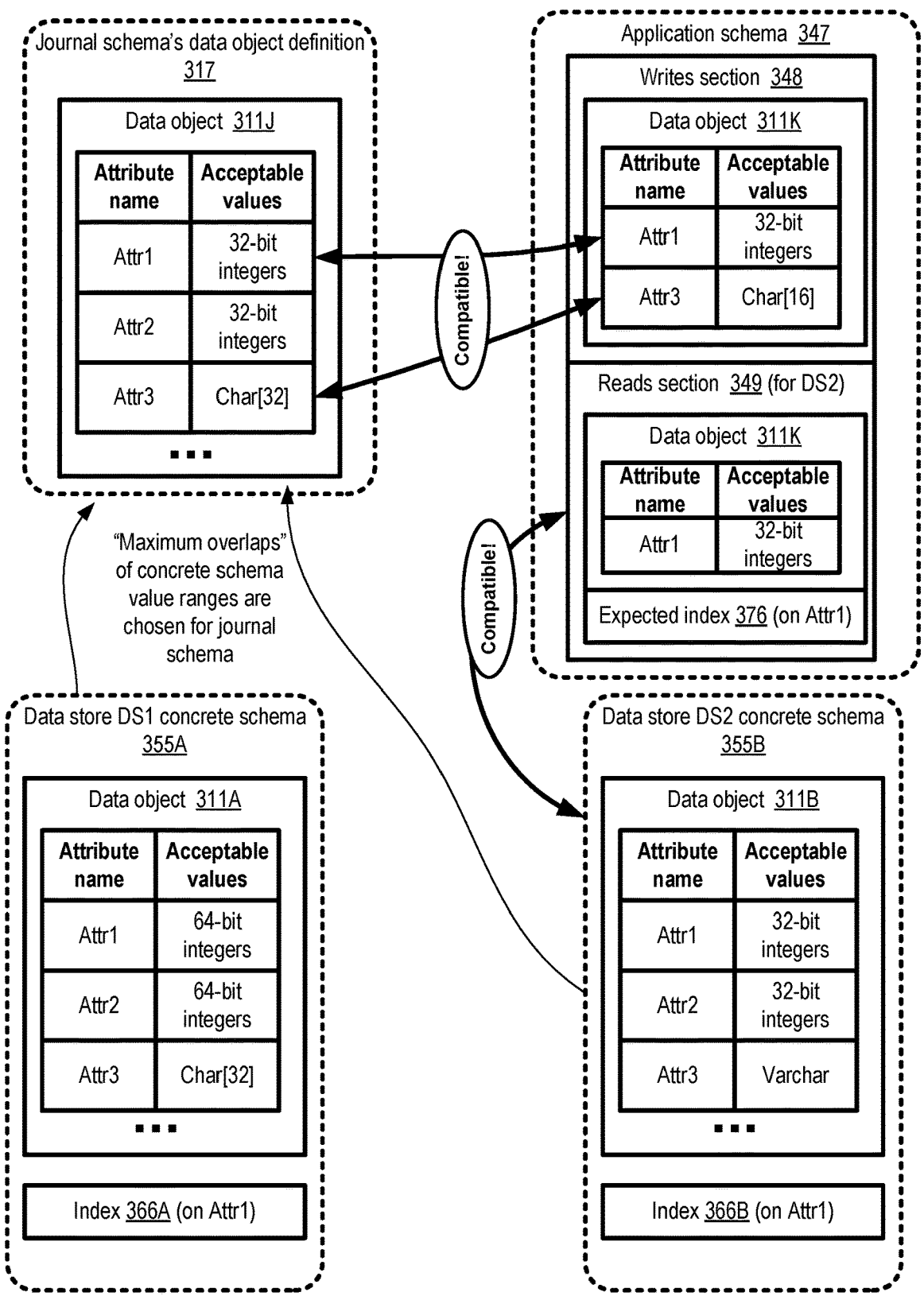
FIG. 3 illustrates example contents of concrete schemas, a portion of a corresponding journal schema derived from the concrete schemas, and an application schema compatible with the journal schema, according to at least some embodiments.

FIG. 3 illustrates example contents of concrete schemas, a portion of a corresponding journal schema derived from the concrete schemas, and an application schema compatible with the journal schema, according to at least some embodiments. The database includes at least two member data stores DS1 and DS2 in the depicted embodiment. A given example data object may be represented using somewhat different attribute data types in the concrete schemas 355A and 355B of the data stores DS1 and DS2 respectively. For example, as specified in concrete schema 355A of data store DS1, values of attributes Attr1 and Attr2 of data object 311A may be stored as respective 64-bit integers, and values of attribute Attr3 may be stored as 32-element character arrays. In contrast, at data store DS2, concreate schema 355B indicates that Attr1 and Attr2 of data object 311B are stored as 32-bit integer values, while Attr3 may be stores as a variable-length character array (varchar). The particular details of the attribute values permitted at a given data store may depend on various factors, such as, for example, the limitations on the data types supported at the data store, the choices made by administrators when creating the concrete schemas 355, and so on. Some popular data stores may only provide support for 32-bit integers, for example for historical reasons, while others may support larger integer ranges.

When generating a journal schema to be shared for transactions associated with both DS1 and DS2, a "maximum overlap" approach towards allowable attribute values may be taken in at least some embodiments. For example, if at least one member data store (e.g., DS2) permits integer values of no more than 32 bits, while all the other data stores (e.g., DS1) support integers of at least 32 bits, then 32-bit integers may be selected for a corresponding integer-valued attribute Attr1 of data object 311J in the journal schema's corresponding data object definition 317. In this example, an integer represented using 32 bits would be compatible with all the data stores (DS1 and DS2), but an integer expressed using more than 32 bits could not be stored at DS2, so 32 bits represents the maximum common overlap. Similarly, although the varchar version of Attr3 in concrete schema 355B of DS2 may comprise more than 32 characters, a character array of 32 elements may be used for Attr3 in the journal schema to maintain compatibility with concrete schema 355A of DS1. In addition to indicating the data types and acceptable values for various attributes, the concrete schemas 355A and 355B each indicate that an index on Attr1 is maintained at the respective data stores DS1 and DS2 (index 366A is maintained at DS1, and index 366B is maintained at DS2).

It is noted that in at least some scenarios, the attribute range limitations of a journal schema may not necessarily result from fundamental limitations of the underlying data stores—e.g., it may be the case that character arrays longer than 32 elements may be permitted at DS1, but the data store administrator of DS1 may nevertheless have chosen 32-element arrays as the data types to use for Attr3. In some embodiments, the member data stores may support non-overlapping data types: for example, all numerical quantities at one data store may be stored as objects of type "number", while numerical data types "integer" or "floating-point" may be supported at a different data store. In such scenarios, the journal schema may in some cases define a different data type (e.g., "NumericValue") which represents as much of an overlap as possible between the value ranges of the different data stores' numeric data types.

In various embodiments, the concept of maximal overlap may be also or instead be employed with respect to the set of attributes indicated in the journal schema. For example, consider an example scenario in which the data object represented by 311A in concrete schema 355A also includes another attribute Attr4, but the corresponding data object 311B of concrete schema 355B only includes Attr1, Attr2 and Attr3. In such a scenario, Attr4 may be excluded from the journal schema data object 311J, since values of Attr4 may not be stored in DS2. In some embodiments, a concrete schema of one data store may be modified (e.g., by the corresponding data store administrator) to accommodate data types of other member data stores—for example, in order to accommodate a 64-bit integer attribute of DS1, a combination of two 32-bit integer attributes may be included in a concrete schema of DS2. Of course, additional data object manipulation logic or code may have to be implemented to enable such transformations or extensions—e.g., software routines to convert a 64-bit integer into two 32-bit integers may have to be executed in the above example for each write of a data object 311.

If the member data stores support different types of data manipulation operations (e.g., different index creation requests), a common set of data manipulation operations that can be supported at all the data stores may be indicated in a transaction language of the journal schema in at least some embodiments. Thus, the approach of including the maximum overlapping functionality of the member data stores in the journal schema may extend to operation syntax in addition to attribute definitions and allowed value ranges.

In the embodiment depicted in FIG. 3, application schema 347 includes a writes section 348 and a reads section 349. Writes section 348 indicates that the application may issue writes directed to attributes Attr1 and Attr3 of data object 311K (which corresponds to data object 311J of the journal schema). In application schema 347, Attr1's acceptable value range is that of a 32-bit integer, which is compatible with the range defined in the journal schema. Also, in application schema 347, Attr3 is indicated as an array of 16 characters, which is also compatible with the array of 32 characters indicated for Attr3 in the journal schema. Since all the expected attributes and value ranges indicated in the writes section 348 can be accommodated by the corresponding attributes indicated in the journal schema, writes section 348 may pass the compatibility check performed by the client-side component on behalf of the application.

Reads section 349 of the application schema 347 indicates that the application may issue reads to DS2 for attribute Attr1, expecting 32-bit integer values, and that the application expects to use an index 376 on Attr1. As the data type defined for Attr1 in DS2's concrete schema matches the data type for Attr1 in the application schema, and as the expected index is maintained at DS2, the reads section may be deemed compatible with the targeted data store DS2 by the client-side component in the depicted embodiment. As illustrated in some of the examples discussed above, exact matches of data types may not be required for compatibility between two schema objects in various embodiments.

Example Event Sequence Leading to Schema Incompatibility

Figure 4A:
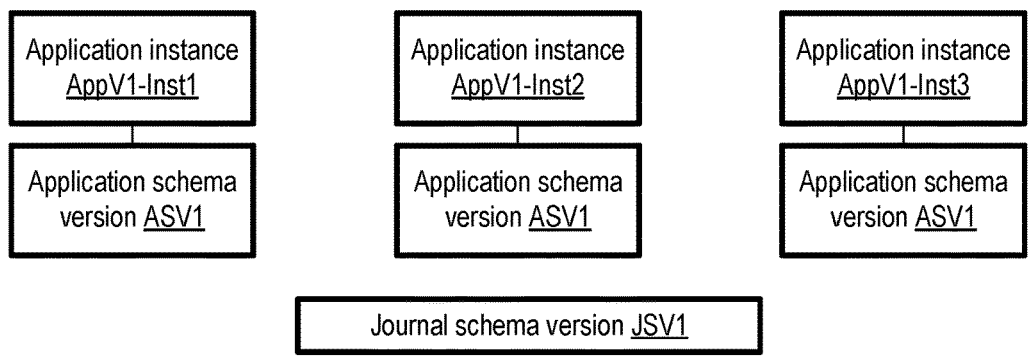
FIG. 4a, FIG. 4b, FIG. 5a and FIG. 5b collectively illustrate an example scenario in which an unsuccessful update of an application instance leads to incompatibility between an application schema and a journal schema, according to at least some embodiments.

FIG. 4a, FIG. 4b, FIG. 5a and FIG. 5b collectively illustrate an example scenario in which an unsuccessful update of an application instance leads to incompatibility between an application schema and a journal schema, according to at least some embodiments. In FIG. 4a, three instances of a version V1 of a particular application are shown with identical application schemas. Each instance of the application (AppV1-Inst1, AppV1-Inst2 and AppV1-Inst3) may execute similar business logic in the depicted embodiment. The different application instances may, for example, comprise respective processes running on respective hosts, each instance utilizing a respective client-side component as a communication channel to the database. As of the point in time corresponding to FIG. 4a, the application schema versions ASV1 are each assumed to be compatible with the current version of the journal schema, JSV1.

Figure 4B:
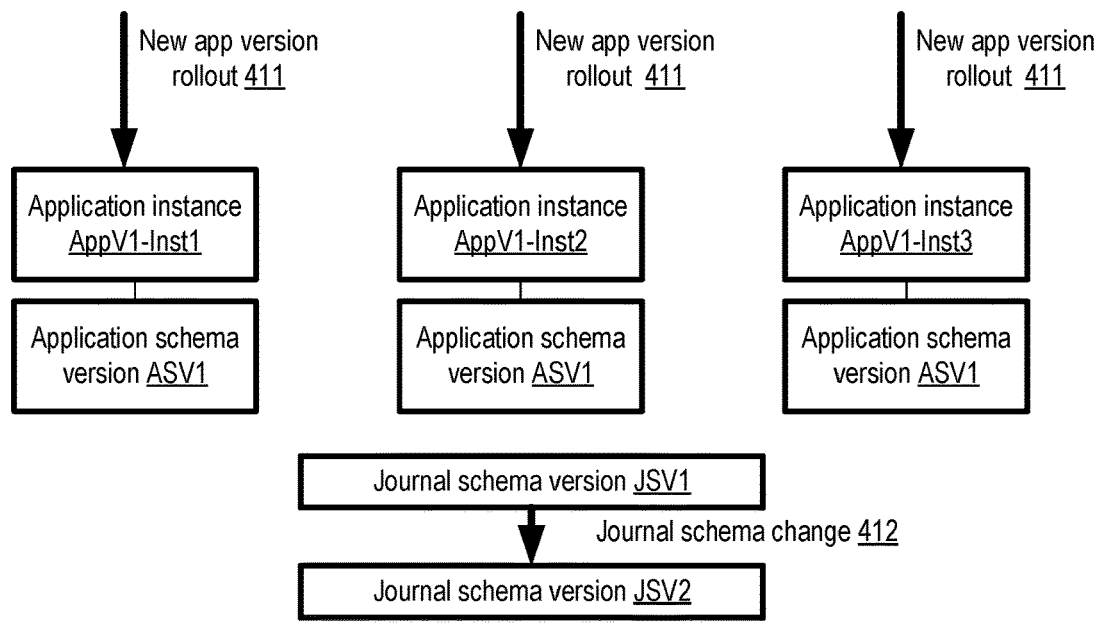

In the scenario depicted in FIG. 4b, a new version of the application is rolled out to each of the hosts at which the application instances are run, as indicated by the arrows labeled 411. A corresponding change may also be applied to the application schema; that is, the application schema may be changed in accordance with the changes made to the application. A change 412 is also committed to the journal schema (e.g., shortly before the new version of the application is propagated to the application hosts), resulting in a new version of the journal schema JSV2. In the depicted example, a dependency may exist between the new version of the application and the change applied to the journal schema—e.g., the old version of the application schema may not be compatible with the new version of the journal schema JSV2, and the old version of the journal schema JSV1 may not be compatible with the new version of the application and the new version of the application schema.

Figure 5A:
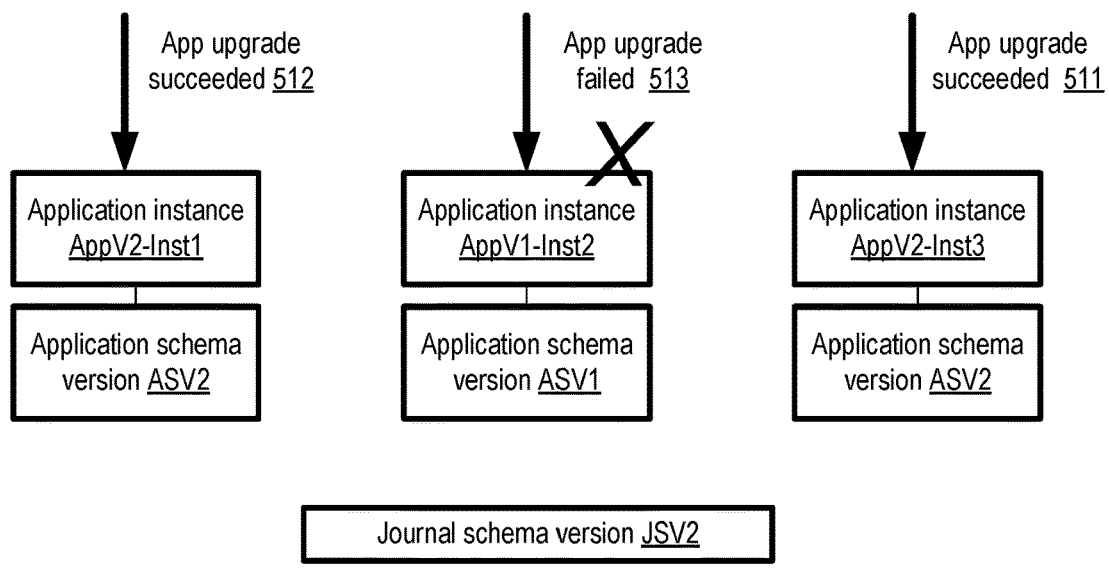
Figure 5B:
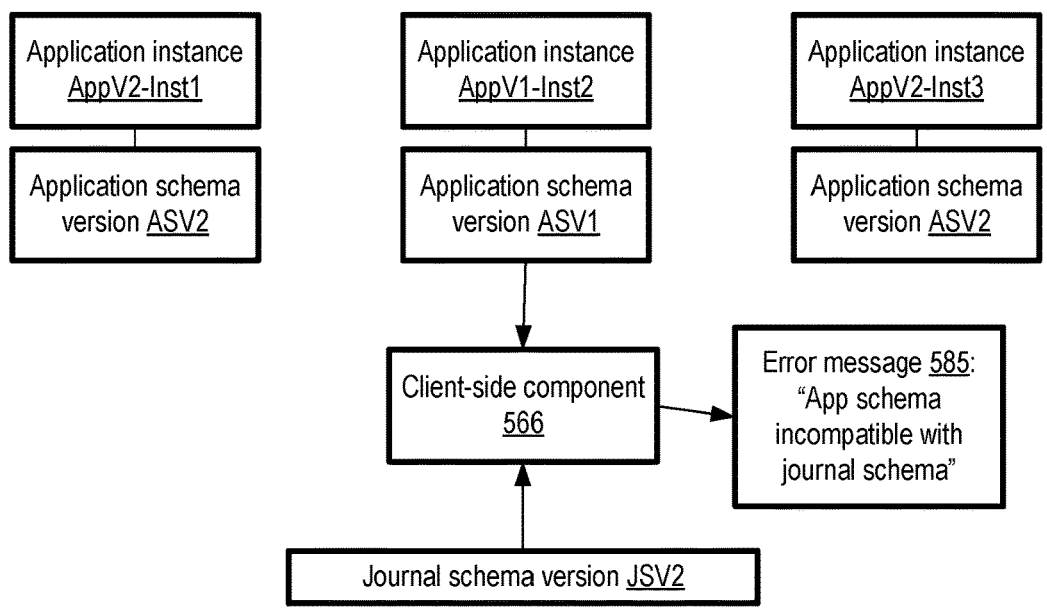

The upgrade to the application succeeds at Inst1 and Inst3, but fails at Inst2, as shown in FIG. 5a. As a result, new versions of the application instances, AppV2-Inst1 and AppV2-Inst3 with corresponding application schemas ASV2, run at two of the three hosts. The client-side components at the successfully-upgraded instances are able to verify compatibility with the new version of the journal schema. However, as shown in FIG. 5b, the client-side component 566 at the application instance whose upgrade failed determines that the application schema ASV1 (which is still the current version) is not compatible with JSV2. Accordingly, the client-side component 566 provides an error message 585 to the application AppV1-Inst2, and may not permit the submission of write-containing transactions from AppV1-Inst2 until the application schema ASV1 and the application instance are upgraded successfully. If application schemas were not being used, client-side component 566 may have instead encountered unexpected failures when it submitted write-containing transactions to the journal manager on behalf of AppV1-Inst2.

Proactive Schema Change Acceptability Verification

Figure 6:
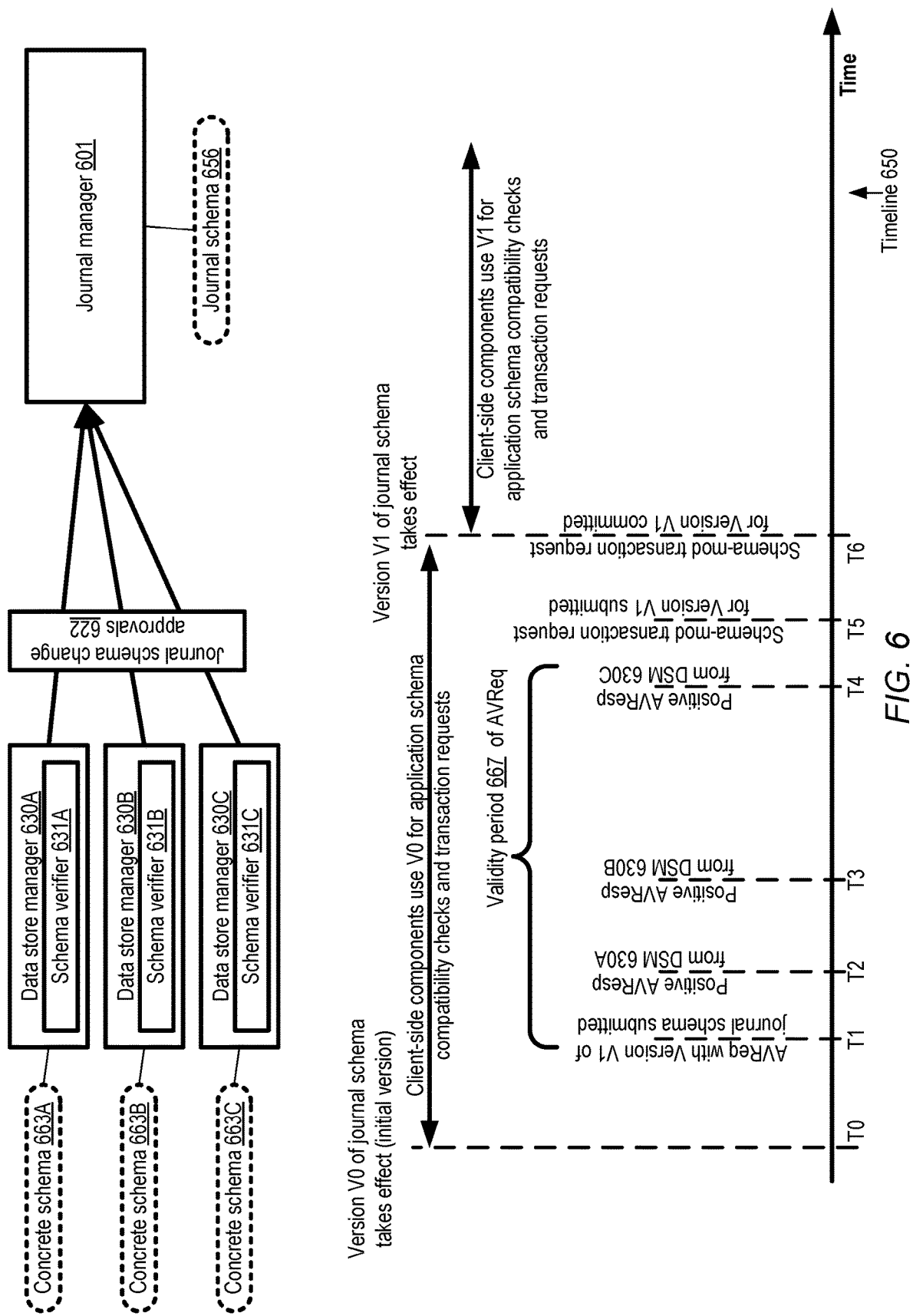
FIG. 6 illustrates aspects of an acceptability verification algorithm which may be used for managing journal schema changes, according to at least some embodiments.

FIG. 6 illustrates aspects of an acceptability verification algorithm which may be used for managing journal schema changes, according to at least some embodiments. The storage system comprises three data stores with respective data store managers 630A, 630B and 630C and respective concrete schemas 663A, 663B and 663C in the depicted embodiment. The journal manager 601 is the authoritative source of the version of the journal schema 656 that is in effect at the storage system at various points in time in the depicted embodiment. Before a new version of the journal schema takes effect, respective acceptability approvals 622 may have to be received from each of the member data store managers 630 in the depicted embodiment. Each data store manager 630 may comprise a respective schema verifier subcomponent 631 (e.g., schema verifiers 631A, 631B and 631C) which checks whether a proposed change to the journal schema is acceptable or compatible with respect to the corresponding concrete schema 663.

Timeline 650 illustrates a series of events which may occur at the storage system, resulting in changes to the version of the journal schema 654. At a time T0 on timeline 650, an initial version V0 of the journal schema takes effect. Time T0 may, for example, correspond to an initialization or bootstrapping stage of the multi-data-store storage system, in which each of the data stores may be brought online. The initial version of the journal schema may be read in, for example, from a respective configuration parameter file or repository in some embodiments by each of the data store managers 630. At time T1, an acceptability request AVReq indicating a new version V1 of the journal schema may be submitted, e.g., by a client-side component (or by one of the data store managers). The data store managers 630B, 630A and 630C may respectively indicate, by transmitting respective positive AVResp messages corresponding to AVReq to the journal manager, that the proposed change is compatible with their respective concrete schemas at times T2, T3 and T4 of timeline 650 in the depicted example. The data store managers 630 may not make any changes to their local versions of the journal schema at this stage. Meanwhile, the original version V0 may remain in effect.

After all three AVResp message have been detected by the AVReq submitter in the journal, a schema-modifying transaction indicating Version V1 of the journal schema may be submitted to the journal manager at time T5. A corresponding transaction entry indicating that Version V1 has been committed may be inserted into the journal at time T6, at which point Version V1 becomes the effective version of the journal schema. Thus, during the interval between T0 and T6, client-side components may format their transaction requests (including the request to change the journal schema version) according to version V0, and used V0 to verify the compatibility of application schemas. After version V1 of the journal schema takes effect at time T6, client-side components which submit journal version requests to the journal manager 601 (or to the data store managers) may receive responses indicating the new version V1, and may start using V1 to check application schema compatibility and to format their transaction requests in accordance with V1. In embodiments in which the client-side components receive their information regarding journal schemas from the data stores rather than from the journal, there may be some delay between T6 (the time at which a commit record entry associated with the journal schema change from V0 to V1 is added to the journal) and the time at which that commit record is applied or processed at the data stores and becomes readable from the data stores. Generally speaking, different data stores may process the commit entry for the journal schema change at different points in time. If the read set descriptor of a given transaction request spans a journal schema change (that is, if some of the data of the read set was read before a journal schema version change, and other data was read after the journal schema version change), in at least some embodiments the transaction request may be rejected by the journal manager.

In the example illustrated in FIG. 6, the AVReq entry may have an associated validity period 667. If all three AVResps are not added to the journal before the validity period expires, the submitter of the AVReq may abandon the proposed journal schema change in the depicted embodiment. Thus, an expiration of the validity period of an AVReq before all the targeted responses are received may be considered the logical equivalent of receiving at least one negative AVResp within the validity period in some embodiments. As mentioned above, in some embodiments positive responses may not be required from all the data store managers—instead, a subset of important data store managers may have to provide positive responses for the submitter of the AVReq to proceed with a transaction request for the proposed journal schema change. It is noted that the submission of the transaction request indicating the schema change (e.g., at time T5 in timeline 650) may not necessarily guarantee that the schema change is committed. For example, conflict detection analysis performed by the journal manager may reveal that a conflicting schema change has been committed since the transaction request of time T5 was prepared by the AVReq submitter, in which case the schema change may be rejected instead of being committed.

Figure 7:
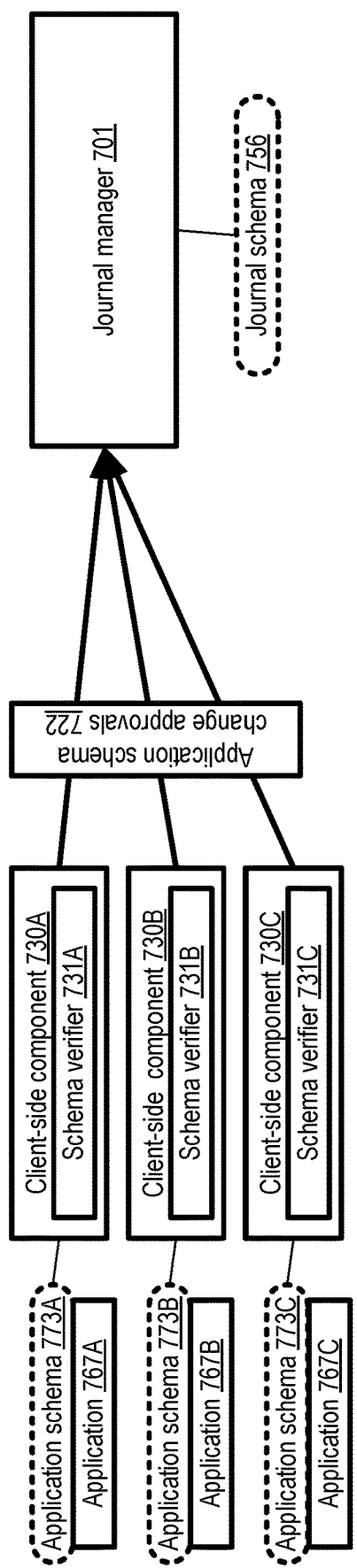
FIG. 7 illustrates aspects of an acceptability verification algorithm which may be used for managing application schema changes, according to at least some embodiments.

In some embodiments, a similar acceptability verification algorithm to that described above may be employed for application schemas. FIG. 7 illustrates aspects of an acceptability verification algorithm which may be used for managing application schema changes, according to at least some embodiments. In the depicted embodiment, three application instances 767A, 767B and 767C are shown with respective application schemas 773A, 773B and 773C. Each application utilizes a respective client-side component 730 (e.g., 730A, 730B or 730C) to communicate with the journal manager 701 and/or one or more data store managers (not shown). In response to triggering conditions, the client-side components verify that the current version of their application schema is compatible with the current version of the journal schema 756. Before a proposed change to a given application schema 773 is committed, an acceptability verification request (AVReq) indicating the change may be sent to the journal manager by the client-side component associated with the application 767 at which the change is proposed. In some embodiments, positive application verification responses (AVResps) may have to be received from each of the other client-side components before the proposed change is committed. Journal entries may be created for the AVReqs and AVResps, as in the scenario discussed with respect to FIG. 6. Client-side components may scan the journal entries to identify AVReqs to which they can respond positively or negatively, and the submitter client-side component of the AVReq may examine journal entries to determine the outcome of the proposal. In some embodiments, if any negative response is identified, the proposed change may be abandoned. In other embodiments, respective positive AVResps from a subset of the client-side components may be sufficient to commit the change. A given AVReq for an application schema change may have an associated validity period in some embodiments, such that if the targeted set of positive AVResps is not received in the validity period, the proposed change may be abandoned. In at least one embodiment, the data store managers and/or the journal manager may participate in the acceptability verification algorithm for application schemas in addition to or instead of peer client-side components of the change proposer.

Applications Designed for Multiple Schema Versions

In some environments different sub-units of an organization may be responsible for journal manager development, data store manager development, and application development. In such cases, the applications and the components of the multi-data-store database may evolve somewhat independently: for example, it may not always be possible for application developers to predict exactly when a new version of the journal schema (which corresponds to a new version of the application schema) is going to be committed. In order to accommodate uncertainty regarding the timing of changes at the journal schema and/or at concrete schemas of member data stores, application developers may sometimes design the applications to work with several different schema versions.

Figure 8:
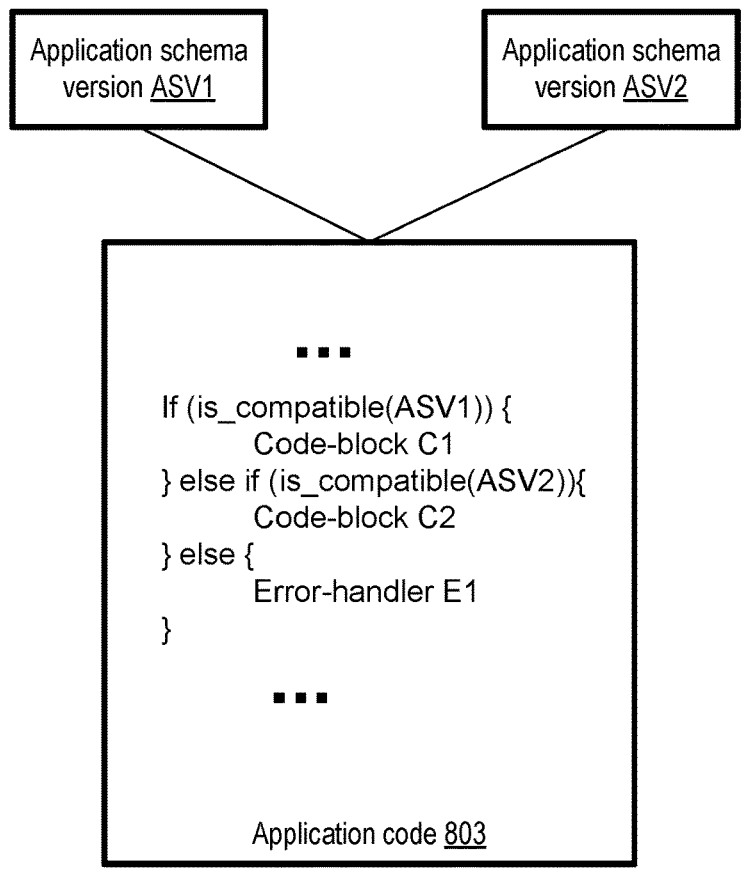
FIG. 8 illustrates an example application which includes logic corresponding to multiple versions of application schemas, according to at least some embodiments.

FIG. 8 illustrates an example application which includes logic corresponding to multiple versions of application schemas, according to at least some embodiments. Two versions of the application schema may be stored in the application metadata in the depicted embodiment: an older version ASV1 and a newer version ASV2. Relative to ASV1, ASV2 may for example include changes in the data types of one or more attributes to be read or written, the range of permitted values for one or more attributes, indexes expected to be used for reads, the particular data objects read or written, the data stores to which reads are directed, and the like. ASV1 and ASV2 may differ in their writes sections, one or more reads sections, or both writes sections and reads sections. Instead of supporting only a single version of the application schema, the application logic may be designed such that it works with the older version of the application schema as long as that older version remains in effect, and to work with the newer version when the newer version takes effect in the depicted embodiment. As shown, for example, application code 803 may include different code blocks or components which can be conditionally executed depending on which version of the application schema is found to be compatible or acceptable. Code block C1 may be executed in the time period during which ASV1 is compatible with the journal schema and/or relevant concrete schemas, while code block C2 may be executed in the time period during which ASV2 is compatible with the journal schema and/or relevant concrete schemas. The function or method "is_compatible(<application-schema>)" may be implemented by the client-side component in the depicted embodiment. The "is_compatible" function may return "true" if the client-side component can verify compatibility of the application schema with the journal schema and/or relevant concrete schemas, and "false" if the client-side component cannot verify such compatibility. If neither version of the application schema is found compatible, an error handler E1 may be executed in the depicted application code 803.

Overview of Journal-Based Transaction Processing

Figure 9:
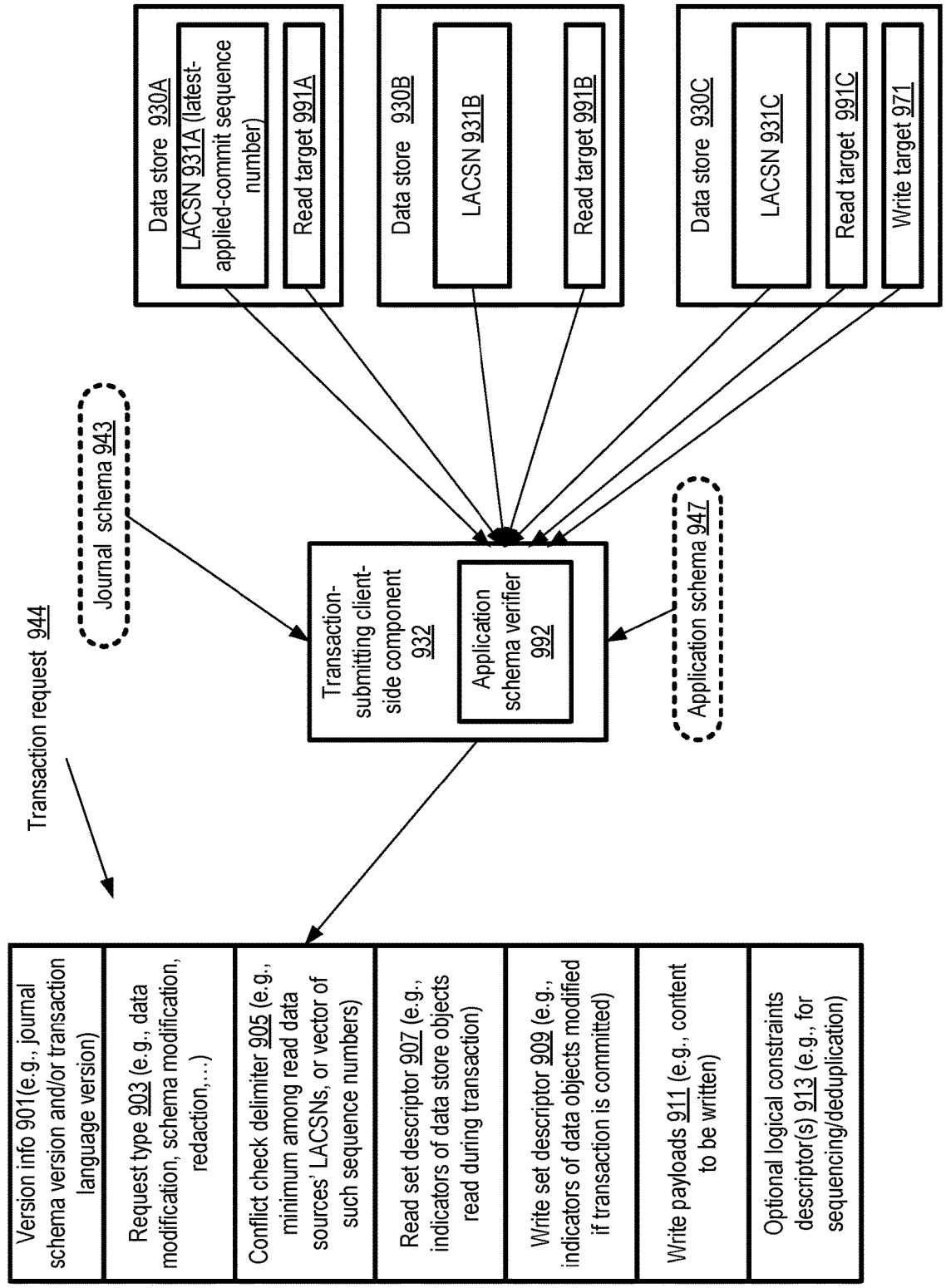
FIG. 9 illustrates an overview of transaction requests which may be submitted to a journal manager by a client-side component of a multi-data-store storage system, according to at least some embodiments.

FIG. 9 illustrates an overview of transaction requests which may be submitted to a journal manager by a client-side component of a multi-data-store storage system, according to at least some embodiments. As shown, a transaction request 944 may include some combination of versioning information 901, a transaction type indicator 903, a conflict check delimiter 905, a read set descriptor 907, a write set descriptor 909, write payload(s) 911, and/or logical constraint descriptors 913 in the depicted embodiment. In some embodiments, authorization to submit transaction requests similar to request 944 may be granted to data store managers at various materialization nodes, as well as to client-side components of the database.

In the depicted embodiment, a transaction-submitting component 932 may comprise a client library which may be utilized to assemble or prepare the transaction request, and an application schema verifier 992. In some implementations the application schema verification module may be implemented as part of the client library. The application schema verifier 992 may detect triggering conditions for checking the compatibility of the current version of the application schema 947 with the journal schema 943 of the storage system. For example, in one embodiment application schema compatibility may be checked whenever an application initiates a preparation of a transaction request, or when the application starts up and accesses the client-side component 932. With respect to write compatibility of application schema 947, the latest version of the journal schema may be obtained, and the properties of the data objects indicated in the application schema 947 may be compared to the properties of those data objects in the journal schema 943. If the application schema includes one or more reads sections, the latest versions of the corresponding concrete schemas may be obtained and used to check whether the properties expected in the application schema are compatible with the properties indicated in the concrete schemas.

With respect to transaction preparation, in at least some embodiments, the client library may automatically record information about the read targets 961A, 961B, and 961C (e.g., corresponding to respective data objects whose attribute details are specified in the journal schema 942) respectively within data stores 930A, 930B and 930C from which data is read during the transaction. In some embodiments, the read set descriptor 907 may be generated by applying transformation functions (e.g., hash functions) to the read query predicates. For example, if a read request logically equivalent to the SQL (Structured Query Language) statement "select salary from EmployeeTable where (name equals 'Alan') or (employeeID equals '123')" were issued by the transaction-submitter 932, the following procedure may be used to represent the portion of the read set corresponding the select statement in one implementation. First, the query predicates (name equals 'Alan') or (employeeID equals '123') may be normalized into a tuple (e.g., 'name: Alan,employeeID:123') expressed in a particular format indicated in journal schema 943. Then, a hash function or other transformation function (which may also be specified in the journal schema as the function to be used to generate the read descriptor) may be applied to convert the normalized tuple(s) into integers (e.g., "−55, 1312"). The output of the transformation function may be included in the read set descriptor 907 in the transaction request 944 in some embodiments. In other embodiments, such transformations of read queries may not be used. In at least some embodiments, the entire text of the read queries corresponding to the read set (e.g., "select salary from EmployeeTable where (name equals 'Alan') or (employeeID equals '123')" in the above example) may also or instead be included in a transaction request 944.

Information about the write target 971 (of data store 930C in the depicted example) to which data is written in the proposed transaction may also be recorded by the client-side component, e.g., by applying similar transformation functions to queries whose results may be affected by the writes. For example, in one embodiment, the journal schema 943 may indicate one or more query restriction descriptors indicating the sets of data object attributes for which read-write conflicts are going to be detected at the database. A set of queries (Q1, Q2, . . . ) directed to such attributes may be identified by the client side-component, such that results of the queries would be affected by the proposed write directed to target 971. The predicates of those queries may then be converted into integers using an algorithm involving normalization followed by transformation in one implementation, in a manner similar to the approach described for the read set descriptor above, and the integers may be included in write set descriptor 909. In embodiments in which both the read set and the write set are represented using sets of integers produced by transformation functions applied to corresponding queries, the task of identifying potential read-write conflicts may be simplified to checking whether any of the integers of a read set description of a proposed transaction are present in the write set descriptors of transactions that have been committed since the operations to read the objects indicated in the read set were performed. Of course, depending on the transformation functions used, the presence of the same integer in a read set and a committed write set may represent a false positive in some embodiments: e.g., the query predicate "attr1:value1" of a read set may have been hashed to the same integer as a different predicate "attr2:value2" of a query affected by a committed write. In at least some embodiments, in addition to or instead of a transformed representation of the write set descriptor, the full text of the proposed write operation directed to target 971 may be included in the transaction request 944. In some embodiments in which transformation functions are used for encoding read set queries and/or queries affected by write sets, any of various techniques for transformation inversion (e.g., reverse mappings from the transformed versions back to the untransformed versions of queries) may be used when preparing contention analyses for the database.

In some implementations, the client-side component may also obtain, from each of the data stores 930, a corresponding latest-applied commit sequence number (LACSN) 931 (e.g., 931A-931C) of the most recent transaction whose writes have been applied at the data store. In one embodiment, such LACSNs 931 may be retrieved before any of the reads of the transaction are issued to the corresponding data stores, for example. In another embodiment, the LACSNs 931 may be retrieved from a given data store 930 just before the first read that is directed to that data store within the current transaction is issued.

In the depicted embodiment, the version number of the journal schema 943 and/or the version number of the data-store independent transaction language being used for the transaction request 944 may be indicated in version information fields 901. In some embodiments, a number of different categories of transactions may be supported—e.g., data object modification transactions, journal schema modification transactions, reaction transactions to enable write appliers to skip processing of previously-stored journal entries, acceptability-verification-related transactions used to pre-approve journal schema changes, and the like. The transaction category may be indicated in a separate transaction type field 903 in the depicted embodiment. In some embodiments, the transaction type may be implicit rather than explicit, e.g., the type of state change being requested may be apparent based on the write set descriptor and/or other elements of transaction request 944. The conflict check delimiter 905 may be derived from a function to which the LACSNs 931 are provided as input in some embodiments. For example, in one implementation, the minimum sequence number among the LACSNs obtained from all the data stores read during the transaction may be used as the delimiter. In another implementation, a vector or array comprising the LACSNs from each of the data stores may be included as the conflict check delimiter 905 of the transaction request descriptor. The conflict check delimiter 905 may also be referred to herein as a committed state identifier, as it represents a committed state of one or more data stores upon which the requested transaction depends. The conflict check delimiter 905 may be used by the journal manager to identify the subset of committed transaction entries to be used to perform conflict detection with respect to the transaction request 944 in various embodiments.

As discussed above, in some embodiments, transformation functions may be applied to read queries to generate the read set descriptor 907, and/or similar transformation functions may be applied to write-affected queries (a set of queries whose results may be affected by the proposed writes) to generate write set descriptor 909. In some embodiments, instead of the query-based transformation, a selected transformation function may instead be applied to the locations/addresses of the read targets to obtain a set of hash values to be included in read descriptor 907. Similarly, a selected transformation function (either the same function as was used for the read descriptor, or a different function, depending on the implementation) may be applied to the location of the write(s) of a transaction to generate the write set descriptor 909 in some embodiments. In another embodiment in which read set descriptors and/or write set descriptors are generated based on locations rather than query contents, hashing may not be used; instead, for example, an un-hashed location identifier may be used for each of the read and write set entries. The write payload 911 may include a representation of the data that is to be written for each of the writes included in the transaction. Logical constraints 913 may include signatures used for duplicate detection/elimination and/or for sequencing specified transactions before or after other transactions in some embodiments. Some or all of the contents of the transaction request 944 may be stored as part of the journal entries (e.g., committed transaction records) in some embodiments. In some embodiments, for example, the full text of the read queries corresponding to the read set, and/or the full text of the write operations corresponding to the write set, may be stored in the committed transaction entries.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Figure 10:
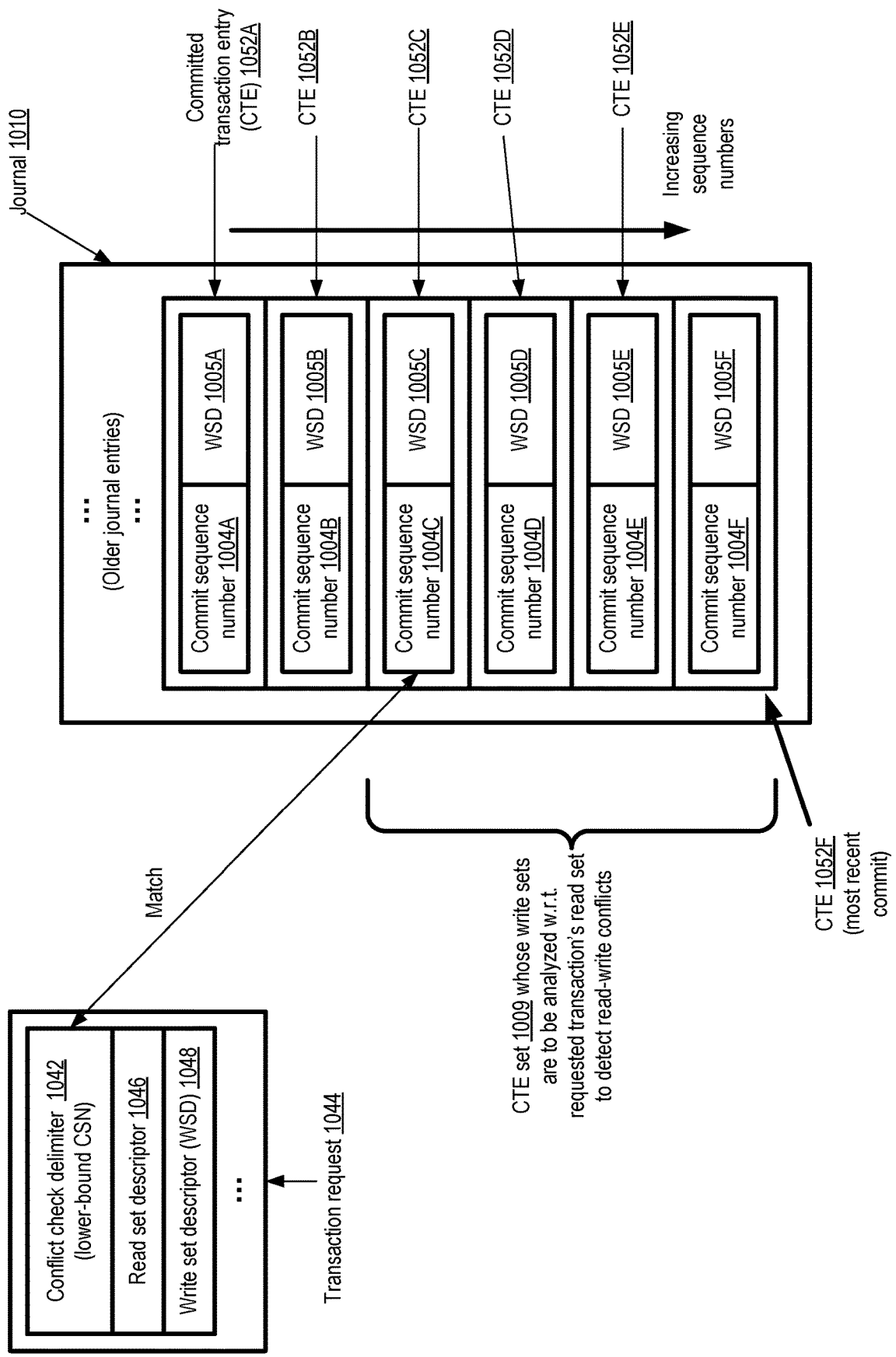
FIG. 10 illustrates an overview of conflict detection operations which may be performed by a journal manager, according to at least some embodiments.

FIG. 10 illustrates an overview of conflict detection operations which may be performed by a journal manager, according to at least some embodiments. Such operations may be performed for at least a subset of the transaction categories supported in various embodiments, such as data object modification transactions and/or journal schema modification transactions. In the depicted example, committed transaction entries (CTEs) 1052 stored at journal 1010 are shown arranged in order of increasing commit sequence numbers from the top to the bottom of the figure. The latest or most recently committed transaction is represented by CTE 1052F, with commit sequence number (CSN) 1004F and write set descriptor (WSD) 1005F. Each of CTEs 1052A, 1052B, 1052C, 1052D and 1052E comprises a corresponding CSN 1004 (e.g., CSNs 1004A-1004E respectively) and a corresponding WSD 1005 (e.g., WSDs 1005A-1005E).

As shown, transaction request 1044 includes a conflict check delimiter (or committed state identifier) 1042, a read set descriptor 1046 and a write set descriptor 1048. (The write payload and various other elements of the requested transaction such as the elements discussed in the context of FIG. 9 are not shown in FIG. 10). The conflict detector of the journal manager may be required to identify a set of CTEs of journal 1010 that are to be checked for conflicts with the read set of the requested transaction. The conflict check delimiter 1042 indicates a lower-bound CSN that may be used by the conflict detector to identify the starting CTE of set 1009 to be examined for read-write conflicts with the requested transaction in the depicted embodiment, as indicated by the arrow labeled "Match". Set 1009 may include all the CTEs starting with the matching sequence number up to the most recent committed transaction (CTE 1052F) in some embodiments. If any of the writes indicated by the CTE set 1009 overlap with any of the reads indicated in the transaction request 1044, such a read-write conflict may lead to a rejection of the requested transaction. A variety of algorithms may be used to check whether such an overlap exists in different embodiments. In one embodiment, for example, one or more hashing-based computations or probes may be used to determine whether a read represented in the read set descriptor 1046 conflicts with a write indicated in the CTE set 1009, thereby avoiding a sequential scan of the CTE set. In some implementations, a sequential scan of CTE set 1009 may be used, e.g., if the number of records in the CTE set is below a threshold. If none of the writes indicated in CTE set 1009 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 1052.

In embodiments in which hash functions or other similar transformation functions are used to represent queries corresponding to reads (in the read set descriptors) and queries which would be affected by writes (in the WSDs), it may sometimes be the case that a detected conflict is a false positive, e.g., due to hash collisions. For example, if a the read set descriptor includes the integer "10" as the representation of a read query RQ, and one of the WSDs of the CTE set 1009 happens to include the integer "10" as the representation of an unrelated query WAQ (write-affected query) whose result would be affected by a committed write, the transaction request 1044 may be rejected despite the fact that the two queries RQ and WAQ did not truly represent a read-write conflict. By choosing transformation functions with appropriate statistical properties, the probability of such collisions and false positives may be reduced in various embodiments.

Figure 11:
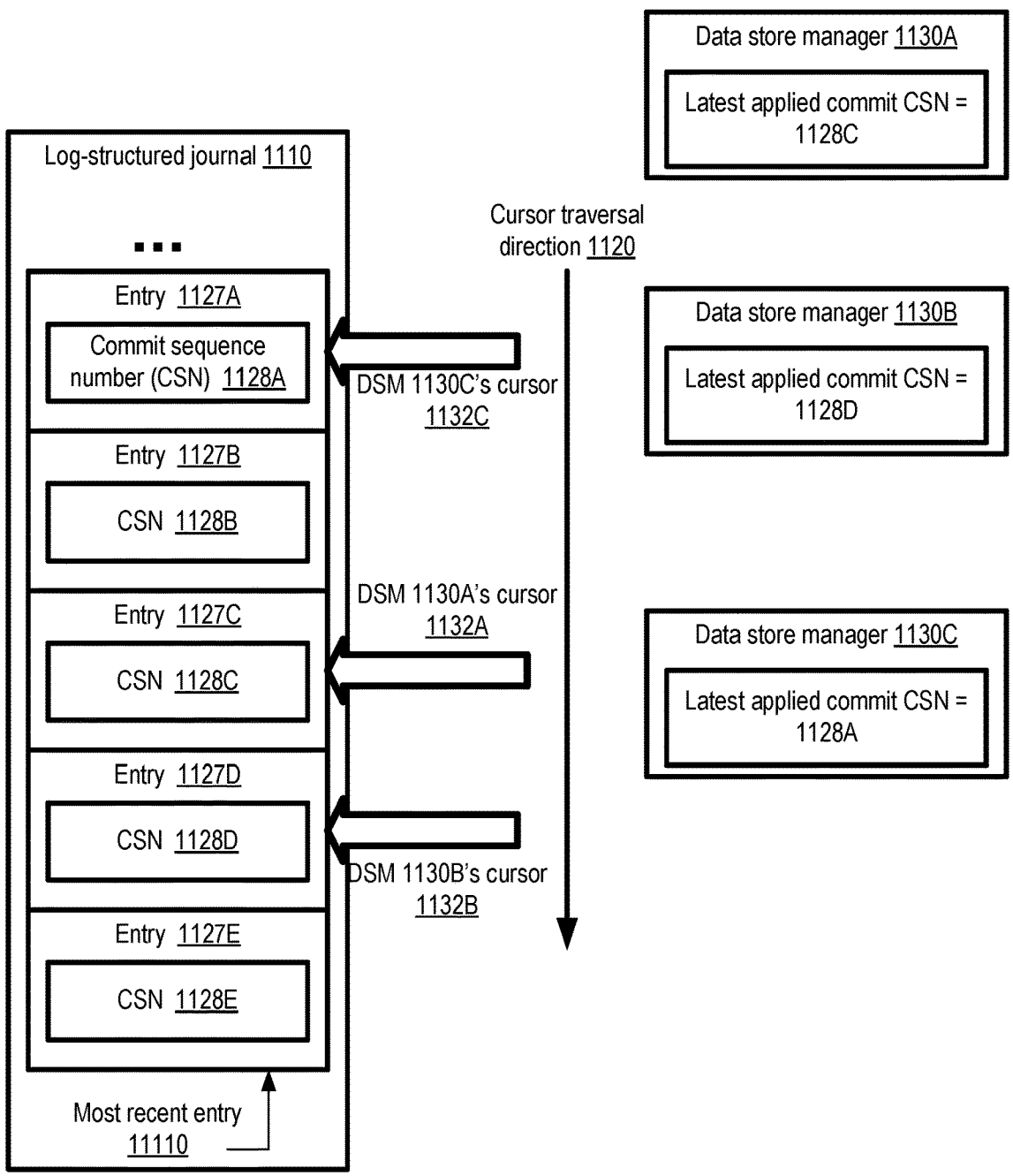
FIG. 11 illustrates an example of asynchronous processing of journal entries to materialize writes at various data stores, according to at least some embodiments.

As mentioned earlier, in various embodiments committed writes may be propagated to materialization nodes by respective write appliers which examine and process the journal sequentially. In some embodiments, entities other than write appliers (such as a performance analysis tool associated with the journal-based database) may also read or consume journal entries; thus, generally speaking, several different kinds of journal entry consumers may be active at a given multi-data-store database. FIG. 11 illustrates an example of asynchronous processing of journal entries to materialize writes at various data stores, according to at least some embodiments. At a point of time corresponding to FIG. 11, the journal 1110 comprises a plurality of entries 1127 inserted in order of respective commit sequence numbers (CSNs) 1128, with the most recent entry 1140 being entry 1127E with CSN 1128E. The most recent entry may sometimes be referred to as the "head" of the journal.

In effect, each of the journal entry consumers 1130 may maintain a cursor onto the sequence of commit entries of the journal, and process the entries in the order in which the entries were inserted into the journal. For example, cursor 1132A is established for consumer 1130A, cursor 1132B is maintained for consumer 1130B, and cursor 1132C is maintained for consumer 1130C in the depicted example. Each of the consumers 1130 may be implemented, for example, as a separate process or thread of execution in some embodiments. As indicated by arrow 1120, each of the cursors processes the entries of journal 1110 in the same order, e.g., in increasing order of CSNs 1128 of the entries. At the point of time illustrated in FIG. 11, entries with CSNs up to 1128C have been processed at consumer 1130A, entries corresponding to CSNs up to 1128D have been processed at consumer 1130B, and entries corresponding to CSNs up to 1128A have been processed at consumer 1130C. A respective processing progress marker (PPM) may be stored or maintained at each consumer node in the depicted embodiment, indicating the CSN of the most recent journal entry whose processing has been completed at that node. Each of the journal consumers may process journal entries independently of the other consumers in the depicted embodiment, and may not necessarily be aware of the existence of other consumers.

Figure 12:
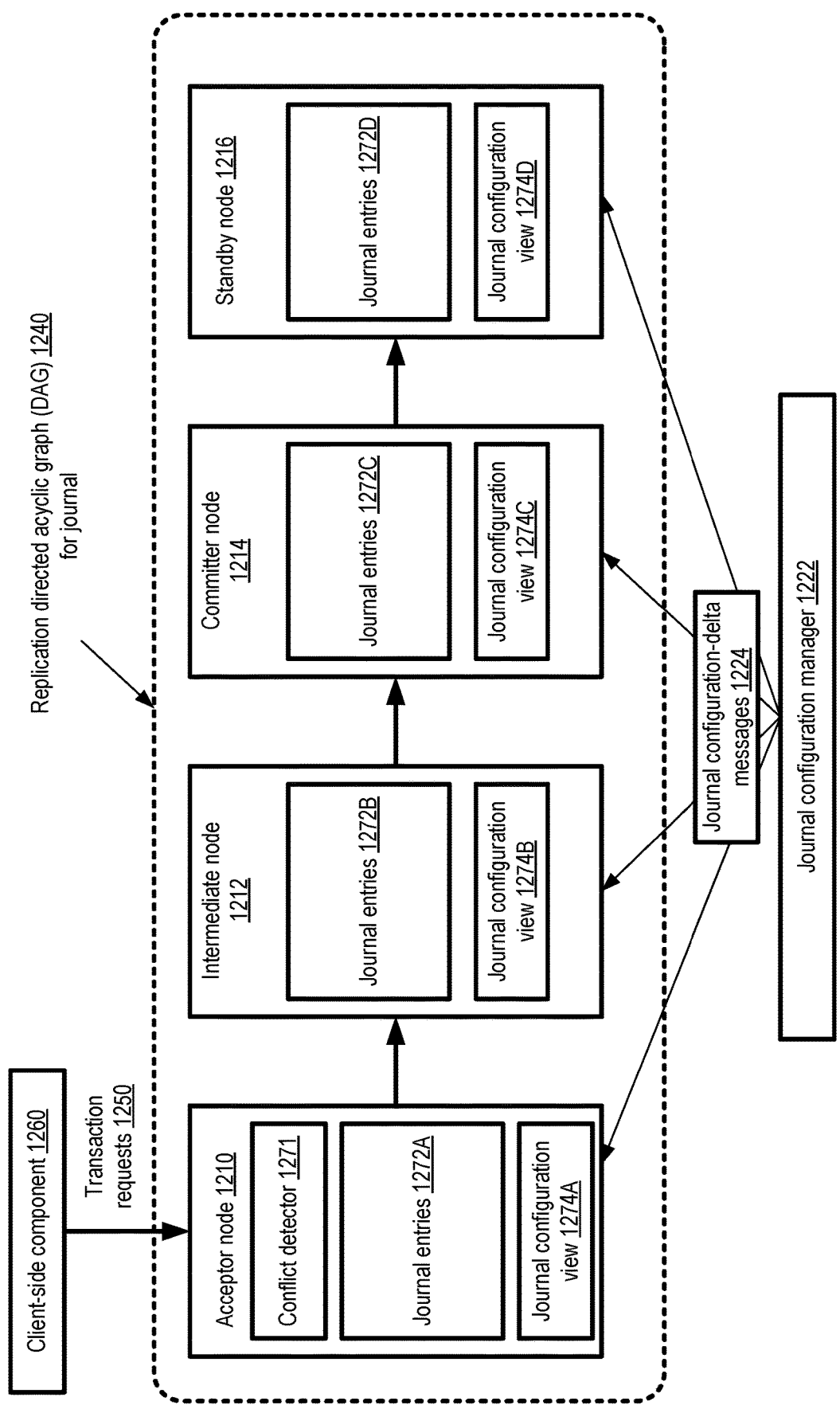
FIG. 12 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 12 illustrates an example replication directed acyclic graph (DAG) which may be used to implement a journal of a multi-data-store storage system, according to at least some embodiments. In general, a replication DAG 1240 may include one or more acceptor nodes 1210 to which transaction requests 1250 may be submitted by submitters 1260 (such as client-side components or data store managers), one or more committer nodes 1214, zero or more intermediary nodes 1212 each positioned along a replication pathway comprising DAG edges leading from an acceptor node to a committer node, and zero or more standby nodes 1216 that are configured to quickly take over responsibilities of one of the other types of nodes in the event of a node failure. In the embodiment depicted in FIG. 12, the acceptor node includes a conflict detector 1271 of the journal manager. In other embodiments, instead of being incorporated within an acceptor node, the conflict detector may be implemented separately.

In at least some embodiments, each node of a particular replication DAG such as 1240 may be responsible for replicating journal entries. The journal entries may be propagated along a set of edges from an acceptor node to a committer node of the DAG along a replication pathway. In FIG. 12, the current replication pathway starts at acceptor node 1210, and ends at committer node 1214 via intermediary node 1212. For a given journal entry (e.g., an entry indicating a committed data object modification or a committed journal schema change), one replica may be stored at each of the nodes along the replication path, e.g., in journal entries 1272A, 1272B and 1272C. Each journal entry propagated within the DAG may include a respective sequence number or a logical timestamp that is indicative of an order in which the corresponding transaction request was processed (e.g., at the acceptor node 1210). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of a transaction may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes. In at least one embodiment, write appliers may be implemented as respective threads or processes that may run at the same hosts at one or more of the DAG nodes. In other embodiments, write appliers may run on different hosts than the DAG nodes. A journal entry may also be transmitted eventually to standby node 1216, and a replica of it may be stored there after it has been committed, so that the standby node 1216 is able to replace a failed node of the DAG quickly if and when such a failover becomes necessary.

A journal configuration manager 1222 may be responsible for managing changes to DAG configuration (e.g., when nodes leave the DAG due to failures, or join/re-join the DAG) by propagating configuration-delta messages 1224 asynchronously to the DAG nodes in the depicted embodiment. Each configuration-delta message may indicate one or more changes to the DAG configuration that have been accepted or committed at the journal configuration manager 1222. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current configuration of the journal DAG than other nodes. In FIG. 12, each of the nodes may update its respective journal configuration view 1274 (e.g., 1274A, 1274B, 1274C or 1274D) based on the particular sequence of configuration-delta messages 1224 it has received from the configuration manager 1222. It may thus be the case, in one simple example scenario, that one node A of a DAG 1240 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 12, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 12.

In at least some embodiments, the nodes of a replication DAG may each be implemented as a respective process or thread running at a respective host or hardware server. The hosts themselves may be physically dispersed, e.g., within various data centers of a provider network. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 1240 may be implemented at a different availability container than other nodes of the replication DAG, thereby increasing the robustness and durability of the journal.

Methods for Supporting Application Schemas

Figure 13:
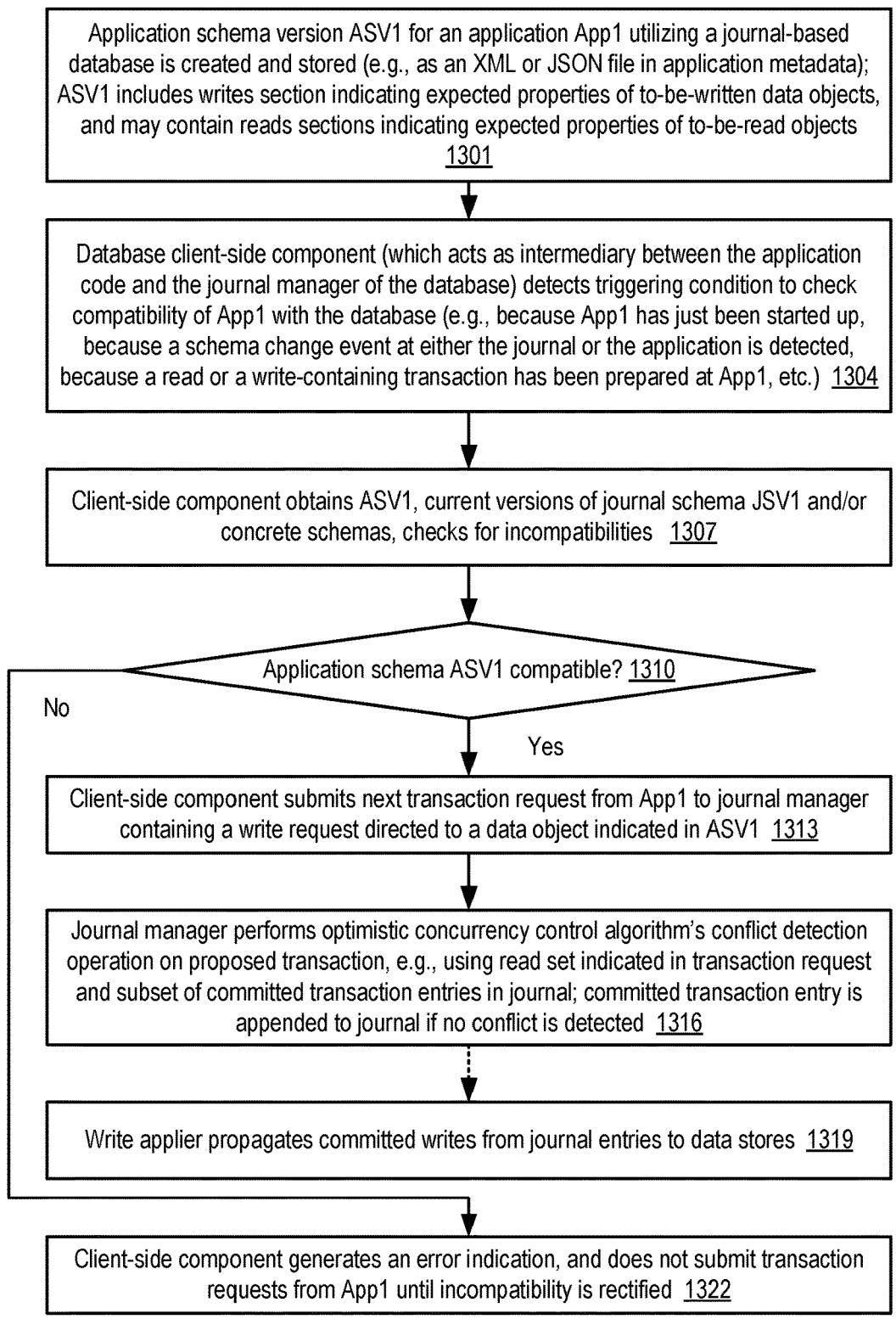
FIG. 13 is a flow diagram illustrating aspects of operations that may be performed at a journal-based multi-data-store storage system in which transaction requests are submitted on behalf of an application by a by client-side component after verifying that an application schema is compatible with a journal schema, according to at least some embodiments.

FIG. 13 is a flow diagram illustrating aspects of operations that may be performed at a journal-based multi-data-store storage system in which transaction requests are submitted on behalf of an application by a by client-side component after verifying that an application schema is compatible with a journal schema, according to at least some embodiments. As shown in element 1301, a version ASV1 of an application schema may be generated (e.g., by application developers or by an automated tool which analyzes the application code and its interactions with the database) and stored for an application which utilizes a journal-based multi-data-store database. ASV1 may be included, for example, among a set of metadata files that are included in a deployment package together with an executable program implementing the application's business logic. In some implementations, ASV1 may comprise one or more JSON files, XML files. In one implementation, ASV1 may be formatted according to a language based at least in part on a version of SQL (Structured Query Language). In the depicted embodiment, ASV1 may include a writes section indicating expected properties (such as object names, data types, permitted value ranges etc.) of one or more data objects to which writes are to be directed from the application. In some embodiments, one or more reads sections may also be included in ASV1, indicating expected properties of one or more data objects to which reads are to be directed from the application. In some scenarios in which an application reads from multiple member data stores of the database, different reads sections may be used for respective data stores. A reads section may be formatted according to the data definition language supported at the corresponding data store in some implementations. For example, a particular reads section associated with a data store implementing a non-relational or relational data model may indicate table names, attribute or column names, data types of the attributes, one or more indexes on a given table, and/or the kinds of queries the data store is expected to receive from the application. ASV1 may evolve over time in various embodiments, e.g., as new versions of the application are rolled out.

The application may utilize a client-side component of the database to submit reads to member data stores, and/or to submit write-containing transactions to the journal manager of the database in various embodiments. As shown in element 1304, the client-side component may detect triggering condition for verifying compatibility of ASV1 with respect to the database. Such verification may be triggered, for example, upon determining that the application is in an initialization phase (e.g., after the application has been started up for the first time, or after the application has been restarted) in some embodiments. In various embodiments, the verification may be triggered when an indication is received at the client-side component that the application schema, journal schema or concrete schema has been updated, when preparation of a new write-containing transaction is initiated, or when a preparation of a read request is initiated.

To perform the compatibility verification, contents of ASV1 may be compared to contents of the current version of the journal schema (for writes sections) and/or to contents of the current versions of concrete schemas (for reads sections) in various embodiments (element 1307). If a data object as specified in an ASV1 writes section cannot be written successfully based on the contents of the journal schema, ASV1 may be deemed incompatible. Similarly, if a concrete schema indicates that a read query for a data object specified in ASV1's reads section (e.g., using an index specified in the reads section) cannot be satisfied by a data store, ASV1 may be deemed incompatible. In some implementations, the journal schema and/or concrete schemas may be retrieved by the client-side component, e.g., from the journal manager (which is the authoritative source of the journal schema) and/or from data store managers, and the compatibility checking may be performed by the client-side component. In other implementations, the client-side component may transmit ASV1 to the journal manager and/or to a data store manager as part of a request to verify compatibility, and the checking may be performed by the journal manager and/or the data store manager. In some embodiments, the reads sections' compatibility check may be performed asynchronously with respect to the writes section's compatibility check—that is, different sections of the application schema may be checked at different times.

If ASV1 is found to be incompatible with the database (as detected in operations corresponding to element 1310), an error indication such as an error message may be generated by the client-side component (element 1322). No transactions may be submitted until the compatibility of the application schema is successfully verified (e.g., after a new version of the application schema, the journal schema or a concrete schema comes into effect) in the depicted embodiment. If ASV1 is compatible with the database (as also detected in element 1310), in contrast, reads may be submitted to the relevant member data stores, and transaction requests comprising writes directed to data objects indicated in ASV1 may be transmitted to the journal manager (element 1313). The journal manager may perform optimistic concurrency control on a submitted transaction request, e.g., by determining whether a read indicated in a read set of the transaction request may have been overwritten by a write-containing transaction whose commit record has been appended to the journal after the read was performed. If no such read-write conflict is detected (and if no other logical constraint violations such as sequencing violations or duplications are identified), the transaction request may be approved for commit, and a commit record may be appended to the journal (element 1316). Respective write appliers may examine the contents of the committed transaction entries, and propagate the relevant sets of committed writes to various member data stores (element 1319).

It is noted that in various embodiments, some of the operations shown in the flow diagram of FIG. 13 may be implemented in a different order than that shown in the figure, or may be performed in parallel rather than sequentially. Additionally, some of the operations shown in the flow diagram may not be required in one or more implementations.

Use Cases

The techniques described above, of verifying the compatibility of evolving applications using application schemas at a multi-data-store database whose state changes are represented as respective journal entries may be useful in a variety of environments. In many large enterprises at which such a journal-based storage system may be employed, application development may be handled by different organization sub-units than the sub-units responsible for the journal-based database. As a result, especially when a new version of an application is to be rolled out to numerous application instances, it may be difficult to coordinate all the application updates with corresponding changes of the journal schema and/or concrete schemas of member data stores. By encapsulating the write-related and read-related expectations of the applications in application schema objects stored as part of application metadata, and by performing schema verification checks proactively at the client-side components of the database, the issuance of transaction requests that may fail because of incompatibility with the back-end database may be prevented, thereby improving application safety and robustness.

Illustrative Computer System

Figure 14:
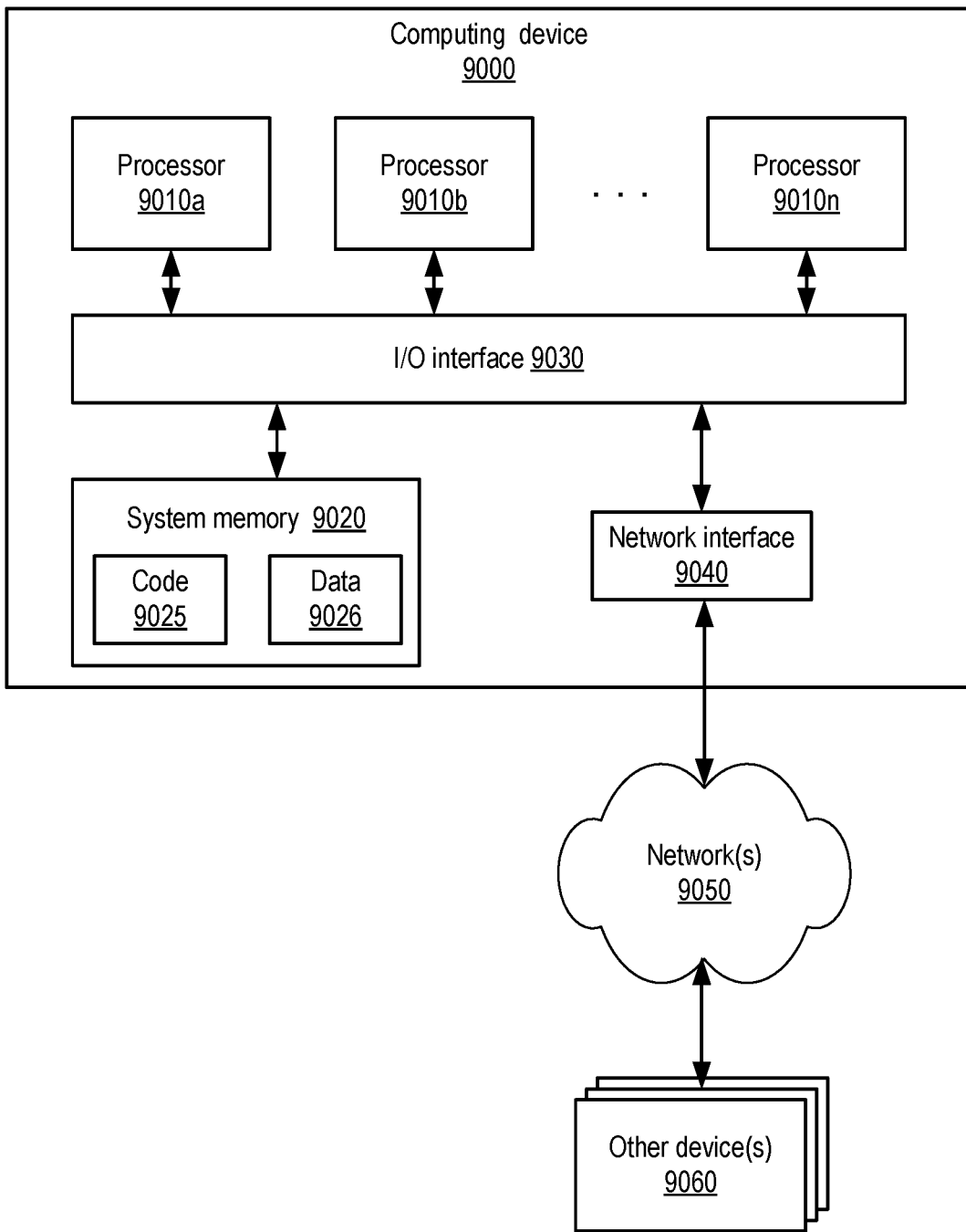
FIG. 14 is a block diagram illustrating an example computing device that may be used in at least some embodiments.

In at least some embodiments, a server that implements one or more of the techniques described above for journal-based transaction management at a multi-data-store storage system (including for example the operations of journal managers, data store managers, client-side components, write appliers, and the like) may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
 one or more client-side hosts storing first program instructions that when executed on one or more processors of the client-side hosts implement a client-side component of a journal-based database;
 one or more server-side hosts storing second program instructions that when executed on one or more processors of the server-side hosts implement the journal-based database that includes:
  at least a first data store;
  a journal manager; and
  a write applier associated with the first data store;
 wherein the first program instructions when executed on the one or more processors of the client-side hosts cause the client-side component to:
  detect that a triggering condition to verify compatibility of a first application with one or more components of the journal-based database has been met;
  identify a first version of an application schema corresponding to the first application, wherein the application schema includes at least a writes section, wherein the writes section specifies a first set of definitions for one or more data objects to which at least one write is to be issued from the first application, and the first set of definitions specify respective sets of expected properties of the one or more data objects, including respective attributes of the one or more data objects and respective data types of the respective attributes;
  obtain, from the journal manager, a journal schema of the journal-based database, wherein the journal schema specifies, in a data-store-independent format, a second set of definitions for one or more other data objects for which an optimistic concurrency-control protocol is implemented by the journal manager, wherein the second set of definitions specify respective sets of properties of the one or more other data objects;
  verify, by the client-side component, that the first version of the application schema is compatible with the journal schema, wherein the verification includes comparing the first set of definitions for the one or more data objects in the application schema with the second set of definitions for the one or more other data objects in the journal schema; and
  transmit, after verifying that the first version of the application schema is compatible with the journal schema, a transaction request of the first application to the journal manager, wherein the transaction request indicates a write set and a read set of a proposed transaction, wherein the write set includes a particular write directed to a particular data object identified in the writes section; and
 wherein the second program instructions when executed on the one or more processors of the server-side hosts cause the journal manager to:
  in response to determining, based at least in part on a conflict detection analysis of the read set with respect to a subset of committed transaction entries of a journal, that the proposed transaction is to be committed, append a new committed transaction entry corresponding to the proposed transaction to the journal, wherein the new committed transaction entry indicates the write set; and
 wherein the second program instructions when executed on the one or more processors of the server-side hosts cause the write applier to:
  materialize, based on examining the new committed transaction entry, the particular write operation at the first data store.

2. The system as recited in claim 1, wherein the first program instructions when executed on the one or more processors of the client-side hosts cause the client-side component to:
 determine that a second version of the application schema is not compatible with the journal schema, wherein the second version of the application schema corresponds to an update applied to the first application; and
 generate an error message indicating unacceptability of the second version of the application schema.

3. The system as recited in claim 1, wherein the expected set of properties of the particular data object indicated in the first set of definitions includes one or more acceptable values of the particular data object.

4. The system as recited in claim 1, wherein the first version of the application schema includes a reads section, wherein the reads section indicates a respective set of expected properties of one or more data objects to which reads are to be issued from the first application, wherein the first program instructions when executed on the one or more processors of the client-side hosts cause the client-side component to:
  verify, prior to directing a read request of the first application to the first data store, that the first version of the application schema is compatible with a concrete schema of the first data store, wherein the concrete schema defines a respective set of properties of one or more data objects which are materialized at the data store by the write applier.

5. The system as recited in claim 4, wherein, within the reads section, the set of expected properties of a particular data object to which reads are to be issued from the first application includes one or more of: (a) a table name, (b) an attribute name, (c) an index type, or (d) a supported query type.

6. A method, comprising:
  identifying, by a first client-side component of a journal-based database, a first version of an application schema corresponding to a first application, wherein the application schema includes at least a writes section, wherein the writes section specifies a first set of definitions for one or more data objects to which at least one write is to be issued from the first application, and the first set of definitions specify respective attributes of the one or more data objects and respective data types of the respective attributes;
  obtaining, by the first client-side component, a journal schema of the journal-based database, wherein the journal schema specifies a second set of definitions for one or more other data objects for which a concurrency-control protocol is implemented by the journal manager;
  verify, by the client-side component, that the first version of the application schema is compatible with the journal schema, wherein the verification includes comparing the first set of definitions for the one or more data objects in the application schema with the second set of definitions for the one or more other data objects in the journal schema;
  submitting, by the first client-side component, after verifying that the first version of the application schema is compatible with the journal schema, a transaction request of the first application to the journal manager, wherein the transaction request indicates a write set and a read set of a proposed transaction; and
  in response to determining, by the journal manager based at least in part on a conflict detection analysis of the read set with respect to a subset of committed transaction entries of a journal, that the proposed transaction is to be committed, storing a new committed transaction entry corresponding to the proposed transaction in the journal, wherein the new committed transaction entry indicates the write set.

7. The method as recited in claim 6, further comprising:
  determining, by the first client-side component, that a second version of the application schema is not compatible with the journal schema, wherein the second version of the application schema corresponds to an update applied to the first application; and
  providing, by the first client-side component to the first application, an error message indicating unacceptability of a different write operation, wherein the different write operation is directed to a particular data object identified in the second version of the application schema.

8. The method as recited in claim 6, wherein the writes section indicates one or more acceptable values for at least some of the one or more data objects.

9. The method as recited in claim 6, wherein the first version of the application schema includes a reads section, wherein the reads section indicates one or more data objects to which reads are to be issued from the first application, further comprising:
  verifying, by the first client-side component prior to directing a read request of the first application to a particular materialization node of the journal-based database, that the first version of the application schema is compatible with a concrete schema of the particular materialization node, wherein the concrete schema defines one or more data objects which are materialized at the particular materialization node.

10. The method as recited in claim 9, wherein, the reads section includes, with respect to a particular data object, one or more of: (a) a table name, (b) an attribute name, (c) an index type, or (d) a supported query type.

11. The method as recited in claim 6, further comprising:
  identifying, by a second client-side component of the journal-based database, a first version of a different application schema corresponding to a second application, and a second version of the different application schema, wherein the second application includes a first subcomponent to be executed in response to a determination that the first version of the different application schema is compatible with the journal schema, and wherein the second application includes a second subcomponent to be executed in response to a determination that the second version of the different application schema is compatible with the journal schema;
  providing, by the second client-side component to the second application, an indication that the first version of the different application schema is compatible with the journal schema, and that the second version of the different application schema is incompatible with the journal schema.

12. The method as recited in claim 6, further comprising:
  generating, by a second client-side component of the journal-based database corresponding to a second application, an error indication based at least in part on determining that the second application does not have an associated application schema.

13. The method as recited in claim 6, further comprising:
  detecting, by a second client-side component of the journal-based database corresponding to a second application, that a triggering condition for a schema compatibility verification of a second application has been met, wherein said detecting comprises one or more of: (a) determining that the second application is in an initialization phase, (b) determining that the journal schema has been updated, (c) receiving an indication of a preparation of a write-containing transaction request of the second application, or (d) receiving an indication of a preparation of a read request of the second application.

14. The method as recited in claim 6, further comprising:
submitting, by the first client-side component to the journal manager, an indication of a proposed change to the application schema of the first application;
appending, to the journal by the journal manager, an acceptability verification entry corresponding to the proposed change to the application schema;
in response to determining, by a second client-side component of the journal-based database after examining the acceptability verification entry, that the proposed change does not meet an acceptance criterion, submitting a rejection message corresponding to the applicability verification request to the journal manager by the second client-side component;
appending, to the journal by the journal manager, an acceptability rejection entry corresponding to the rejection message; and
generating, by the first client-side component, after examining the acceptability rejection entry, an error message indicating that the propose change to the application schema is unacceptable.

15. The method as recited in claim 6, wherein said identifying the first version of the application schema comprises examining contents of a metadata file stored in a deployment package of the first application, wherein the metadata file is formatted in accordance with one or more of: (a) a version of JSON (JavaScript Object Notation) or (b) a version of XML (Extensible Markup Language).

16. A non-transitory computer-accessible storage medium storing program instructions that when executed on one or more processors implement a client-side component of a journal-based database and cause the client-side component to:
identify a first version of an application schema corresponding to a first application, wherein the application schema specifies a first set of definitions for one or more data objects to which at least one write is to be issued from the first application, and the first set of definitions specify respective attributes of the one or more data objects and respective data types of the respective attributes;
obtain a journal schema of the journal-based database, wherein the journal schema specifies a second set of definitions for one or more other data objects for which a concurrency-control protocol is implemented by a journal manager;
verify that the first version of the application schema is compatible with the journal schema, wherein the verification includes comparing the first set of definitions for the one or more data objects in the application schema with the second set of definitions for the one or more other data objects in the journal schema; and
submit, after verifying that the first version of the application schema is compatible with the journal schema, a transaction request of the first application to the journal manager, wherein the transaction request indicates a write set and a read set of a proposed transaction, wherein the write set includes a particular write directed to a particular data object indicated in the application schema.

17. The non-transitory computer-accessible storage medium as recited in claim 16, wherein the program instructions when executed on the one or more processors cause the client-side component to:
determine that a second version of the application schema is not compatible with the journal schema, wherein the second version of the application schema corresponds to an update applied to the first application; and
generate an error message indicating unacceptability of a different write operation, wherein the different write operation is directed to a particular data object identified in the second version of the application schema.

18. The non-transitory computer-accessible storage medium as recited in claim 16, wherein the application schema indicates one or more acceptable values of the particular data object.

19. The non-transitory computer-accessible storage medium as recited in claim 16, wherein the one or more data objects to which at least one write is to be issued from the first application are included in a writes section of the first version of the application schema, wherein the first version of the application schema includes a reads section, wherein the reads section indicates one or more data objects to which reads are to be issued from the first application, wherein the program instructions when executed on the one or more processors cause the client-side component is configured to:
verify, prior to directing a read request of the first application to a particular materialization node of the journal-based database, that the first version of the application schema is compatible with a concrete schema of the particular materialization node, wherein the concrete schema defines one or more data objects which are materialized at the particular materialization node.

20. The non-transitory computer-accessible storage medium as recited in claim 19, wherein the reads section includes, with respect to a particular data object in the read section, one or more of: (a) a table name, (b) an attribute name, (c) an index type, or (d) a supported query type.

* * * * *